(12) United States Patent
Kumano et al.

(10) Patent No.: US 8,443,138 B2
(45) Date of Patent: May 14, 2013

(54) RECORDING MEDIUM STORING MANAGEMENT PROGRAM, MANAGEMENT DEVICE AND MANAGEMENT METHOD

(75) Inventors: Tatsuo Kumano, Kawasaki (JP); Yasuo Noguchi, Kawasaki (JP); Kazutaka Ogihara, Kawasaki (JP); Masahisa Tamura, Kawasaki (JP); Yoshihiro Tsuchiya, Kawasaki (JP); Tetsutaro Maruyama, Kawasaki (JP); Takashi Watanabe, Kawasaki (JP); Kazuichi Oe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 485 days.

(21) Appl. No.: 12/788,546

(22) Filed: May 27, 2010

(65) Prior Publication Data

US 2010/0306495 A1 Dec. 2, 2010

(30) Foreign Application Priority Data

May 28, 2009 (JP) .................................. 2009-128386

(51) Int. Cl.
*G06F 12/06* (2006.01)

(52) U.S. Cl.
USPC ..................... 711/112; 711/170; 711/E12.084

(58) Field of Classification Search .................. 711/112, 711/170, E12.084
See application file for complete search history.

(56) References Cited

U.S. PATENT DOCUMENTS

2002/0004857 A1 1/2002 Arakawa et al.

FOREIGN PATENT DOCUMENTS

| JP | 8-63298 | 3/1996 |
| JP | 2008-152807 | 7/2008 |

*Primary Examiner* — Yong Choe
(74) *Attorney, Agent, or Firm* — Staas & Halsey LLP

(57) ABSTRACT

A management device obtains, from the plurality of storage nodes, information of accesses which are made to the actual storage areas included in the storage nodes, generating load information of the actual storage areas based on the access information, and storing the generated load information in a load information storage unit. The device changes, based on the load information stored in the load information storage unit, the assignment relations of the actual storage areas with respect to the virtual storage areas such that loads of the storage nodes are leveled. The device instructs the plurality of storage nodes to move the data in the actual storage areas depending on change in the assignment of the actual storage areas to the virtual storage areas.

9 Claims, 20 Drawing Sheets

FIG.9

| ACCESS STATISTICAL TABLE | | SN-A | SLICE ID: 1 |
|---|---|---|---|
| I/O SIZE | LAPSED TIME | NUMBER OF READ IOs | NUMBER OF WRITE IOs |
| 512B | 30 HOURS | 502300 | 250100 |
| 1kB | 30 HOURS | 437500 | 189400 |
| 2kB | 30 HOURS | 879400 | 209700 |
| … | … | … | … |

FIG.11

| STORAGE-NODE LOAD MANAGEMENT TABLE | | |
|---|---|---|
| NODE ID | LOAD PROVIDED BY SLICES WHICH HAVE ALREADY BEEN ASSIGNED | LOAD PROVIDED BY SLICES FOR WHICH ASSIGNMENT DESTINATION IS UNDER CONSIDERATION |
| SN-A | 60% | 35% |
| SN-B | 50% | 20% |
| SN-C | 40% | 25% |
| SN-D | — | — |

FIG.12

| TENTATIVE ASSIGNMENT MANAGEMENT TABLE ||||
|---|---|---|---|
| NODE ID | SLICE ID | SLICE LOAD | ASSIGNMENT FLAG |
| SN-A | 1 | 20% | SET |
| SN-A | 2 | 30% | SET |
| SN-A | 3 | 10% | SET |
| SN-A | 4 | 35% | NOT YET SET |
| SN-B | 1 | 30% | SET |
| SN-B | 2 | 10% | SET |
| SN-B | 3 | 10% | SET |
| SN-B | 4 | 20% | NOT YET SET |
| SN-C | 1 | 10% | SET |
| SN-C | 2 | 20% | SET |
| SN-C | 3 | 10% | SET |
| SN-C | 4 | 25% | NOT YET SET |

| STORAGE-NODE LOAD MANAGEMENT TABLE |||
|---|---|---|
| NODE ID | LOAD PROVIDED BY SLICES WHICH HAVE ALREADY BEEN ASSIGNED | LOAD PROVIDED BY SLICES FOR WHICH ASSIGNMENT DESTINATION IS UNDER CONSIDERATION |
| SN-A | 0% | 90% |
| SN-B | 0% | 40% |
| SN-C | 0% | 30% |
| SN-D | 0% | 20% |

RECORDING MEDIUM STORING MANAGEMENT PROGRAM, MANAGEMENT DEVICE AND MANAGEMENT METHOD

CROSS-REFERENCE TO RELATED APPLICATIONS

This application is based upon and claims the benefit of priority of the prior Japanese Patent Application No. 2009-128386, filed on May 28, 2009, the entire contents of which are incorporated herein by reference.

FIELD

The embodiments discussed herein are related to the field for managing a distributed storage system via a network.

BACKGROUND

At present, data processing using a computer is prevailed and the storage technique for storing and utilizing data takes a more important role. A distributed storage system has recently been constructed in order to increase reliability in storage of data and to speed up utilization of data.

In the distributed storage system, a plurality of storage nodes are interconnected via a network. Each of the storage nodes includes a storage device and stores data. Data can be stored in the storage nodes in a distributed manner. With such distribution of data, a load can be distributed to the plurality of storage nodes and a system speed can be increased. Further, access nodes can be arranged in plural storage nodes with redundancy of data. As a result, reliability in storage of data can be increased.

In management of system operations, loads generated in nodes constituting the system are monitored. Monitoring the loads makes it possible to specify a node on which the load tends to concentrate and a node which has a sufficient processing capability. Tuning of the entire system, leveling of data capacity, expansion of hardware resources, addition of functions, etc. can be properly performed based on the monitoring results depending on respective utilization statues of the nodes.

In a disk array device, for example, it is considered to obtain frequency of accesses to a plurality of built-in disk devices, a read/write time for each access, etc. One practically conceivable proposal is to move one or more of plural stripes on the disk devices, for which the access frequency is relatively high, onto one of the disk devices which has higher performance than the currently used disk device. Another practically conceivable proposal is to change an arrangement destination of data stored in a logical unit (resulting from coupling two or more logical areas together) to another logical unit depending on not only information obtained for each logical area in the disk array device, but also on given conditions (such as demanded levels of performance and reliability).

In the distributed storage system, a logical area (logical volume) is prepared over a plurality of storage nodes. The logical volume is managed in a way divided into a plurality of actual storage areas (slices) prepared on the disk device. For example, a plurality of slices on a plurality of storage nodes are made correspondent to a single logical volume.

Hitherto, however, there has not been a technique for collecting load information per slice from the plurality of storage nodes. In the distributed storage system where slice assignment to the storage nodes is executed via the network, therefore, loads cannot be leveled among the storage nodes in consideration of the load of each slice.

SUMMARY

A management device manages assignment relations between a plurality of virtual storage areas included in a logical volume and actual storage areas in recording devices included respectively in a plurality of storage nodes, the actual storage areas becoming storage destinations of data which are accessed by designating the virtual storage areas. The device obtains, from the plurality of storage nodes, information of accesses which are made to the actual storage areas included in the storage nodes, generating load information of the actual storage areas based on the access information, and storing the generated load information in a load information storage unit. The device changes, based on the load information stored in the load information storage unit, the assignment relations of the actual storage areas with respect to the virtual storage areas such that loads of the storage nodes are leveled. The device instructs the plurality of storage nodes to move the data in the actual storage areas depending on change in the assignment of the actual storage areas to the virtual storage areas.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 9 illustrates an example of a data structure of an access statistical table according to the first embodiment.

FIG. 11 illustrates an example of a data structure of a storage-node load management table according to the first embodiment.

FIG. 12 illustrates an example of a data structure of a tentative assignment management table according to the first embodiment.

FIG. 17 illustrates an example of a data structure of a storage-node load management table according to a second embodiment.

DESCRIPTION OF EMBODIMENTS

Various embodiments will be described in detail below with reference to the drawings.

Figure 1:
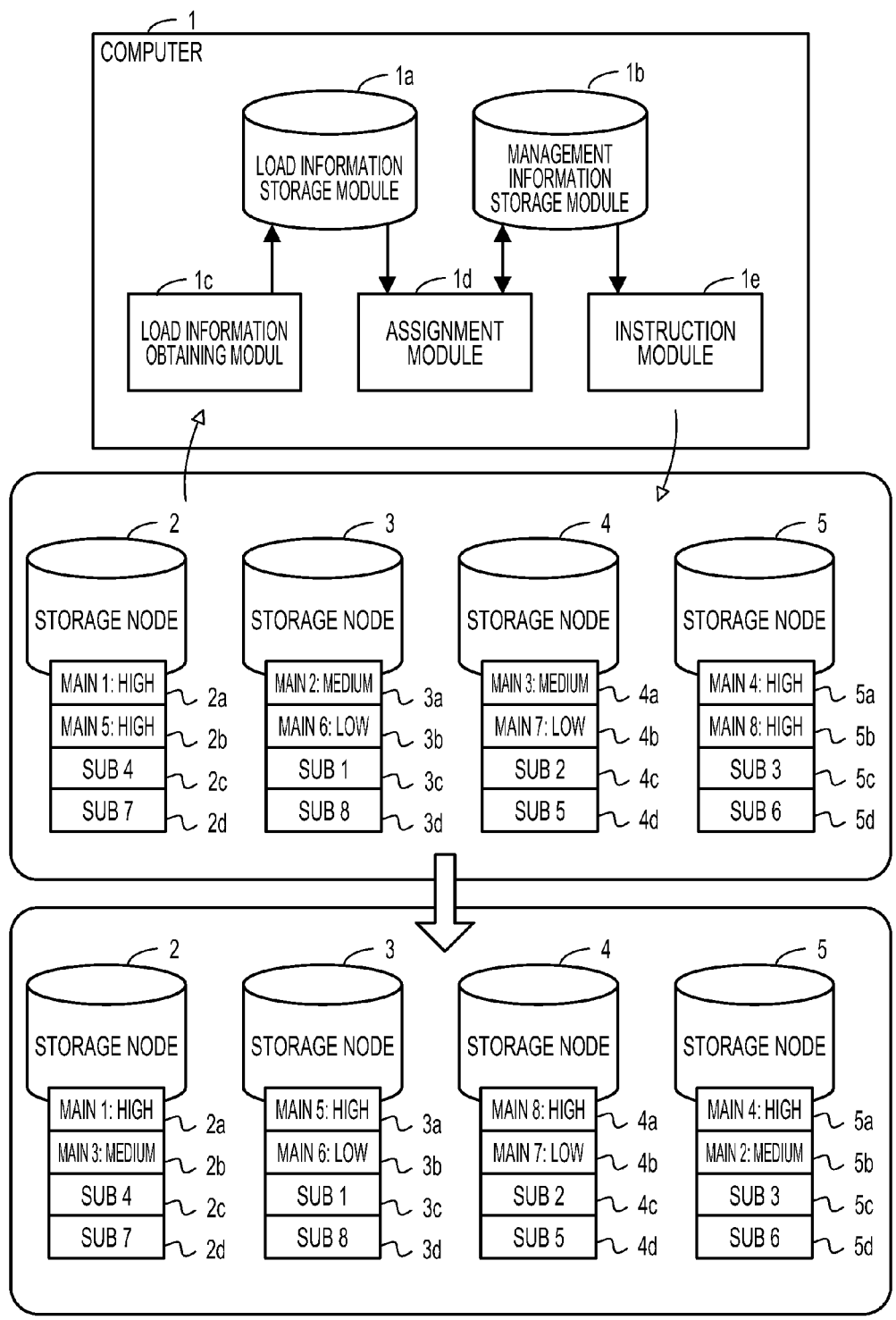
FIG. 1 is a block diagram illustrating a distributed storage system according to an embodiment.

FIG. 1 is a block diagram illustrating a distributed storage system according to the embodiment. The distributed storage system includes a computer 1 and storage nodes 2, 3, 4 and 5. The computer 1 and the storage nodes 2, 3, 4 and 5 are interconnected via a network. The computer 1 manages arrangement of data with respect to actual storage areas which are prepared in the storage nodes 2, 3, 4 and 5.

Actual storage areas 2a, 2b, 2c and 2d are prepared in the storage node 2. Actual storage areas 3a, 3b, 3c and 3d are prepared in the storage node 3. Actual storage areas 4a, 4b, 4c and 4d are prepared in the storage node 4. Actual storage areas 5a, 5b, 5c and 5d are prepared in the storage node 5. In the distributed storage system, the actual storage areas are made correspondent to a plurality of virtual storage areas which are included in a logical volume and which become targets of data access.

The computer 1 includes a load information storage module 1a, a management information storage module 1b, a load information obtaining module 1c, an assignment module 1d, and an instruction module 1e.

The load information storage module 1a stores load information indicating respective loads applied to the actual storage areas which are prepared in the storage nodes 2, 3, 4 and 5.

The management information storage module 1b stores management information for managing assignment relations between the virtual storage areas and the actual storage areas. With the management information, for example, the actual storage areas 2a and 3c are made correspondent to one virtual storage area.

The actual storage area 2a stores, for example, main data (MAIN 1) that is used as an access destination when access is requested. In that case, the actual storage area 3c stores sub-data (SUB 1) that is used as a backup for the main data (MAIN 1). Further, the management information includes definition of the correspondence between the main data (MAIN 1) arranged in the actual storage area 2a and the sub-data (SUB 1) arranged in the actual storage area 3c. The above description is similarly applied to the other storage areas.

The load information obtaining module 1c obtains access information, including information related to access performance and access statistics, from the storage nodes 2, 3, 4 and 5. The load information obtaining module 1c obtains respective loads applied to the actual storage areas of the storage nodes 2, 3, 4 and 5 to generate load information based on the obtained access information, and stores the generated load information in the load information storage module 1a. An amount of load may be determined depending on, for example, access frequency for read and write with respect to each of the actual storage areas.

The load information sets, e.g., whether the access load applied to the actual storage area storing the main data is high or medium or low. For example, the load of the actual storage area 2a is set "high", the load of the actual storage area 3a is set "medium", and the load of the actual storage area 4b is set "low". This is similarly applied to the other actual storage areas.

The assignment module 1d manipulates, based on the load information stored in the load information storage module 1a, the management information stored in the management information storage module 1b to change the relations in assignment of the actual storage areas to the virtual storage areas such that the loads of the storage nodes 2, 3, 4 and 5 are leveled.

The instruction module 1e instructs, upon change in the assignment of the actual storage area to the virtual storage area, corresponding one of the storage nodes 2, 3, 4 and 5 to move data in the actual storage area by referring to the management information stored in the management information storage module 1b.

Stated another way, with the computer 1, information regarding the accesses made to the actual storage areas is obtained from the storage nodes 2, 3, 4 and 5 by using the load information obtaining module 1c. The load information indicating respective loads applied to the actual storage areas of the storage nodes 2, 3, 4 and 5 is generated from the access information by using the load information obtaining module 1c, and the generated load information is stored in the load information storage module 1a. The relations in assignment of the actual storage areas to the virtual storage areas is changed by the assignment module 1d based on the load information, which is stored in the load information storage module 1a, such that the loads of the storage nodes 2, 3, 4 and 5 are leveled. Upon change in the assignment of the actual storage area to the virtual storage area, movement of data in the actual storage area is instructed to corresponding one of the storage nodes 2, 3, 4 and 5 by the instruction module 1e.

As a result, the loads of the storage nodes belonging to the distributed storage system can be leveled. More specifically, since data arrangement to the actual storage areas is changed depending on the loads of the actual storage areas in the storage nodes 2, 3, 4 and 5, fine adjustment can be performed so as to level the loads of the storage nodes 2, 3, 4 and 5. Hence, the loads can be avoided from becoming high locally and access performance can be increased over the entire system.

On that occasion, the assignment module 1d may assign the arrangement destination of the main data such that the arrangement destination of the main data and the arrangement destination of the sub-data having the same contents as those of the main data will not belong to the same storage node.

For example, the assignment module 1d selects the arrangement destination of the main data (e.g., MAIN 1) from the storage nodes (e.g., the storage nodes 2, 4 and 5) in which the corresponding sub-data (SUB 1) is not arranged.

Since the main data and the corresponding sub-data are thus arranged in different storage nodes when the data arrangement is changed, both the data are prevented from belonging to the same single storage node. Accordingly, even when some one storage node is cut off (or disconnected), it is possible to obviate a trouble that both of redundant data cannot be accessed, and to avoid reduction of the reliability.

Further, the computer 1 may periodically obtain, e.g., the load information of the storage nodes 2, 3, 4 and 5.

The computer 1 may execute the above-described change of the data arrangement destination at the timing, such as the timing when any of the storage nodes 2, 3, 4 and 5 is stopped, the timing when the occurrence of a failure in any of the storage nodes is detected, or the timing when a new storage node is added. As an alternative, the computer 1 may periodically execute the above-described change of the data arrangement destination.

Thus, by changing the data arrangement destination at the predetermined timing as appropriate, the computer 1 can operate the distributed storage system with higher efficiency in consideration of the access performance of the distributed storage system.

A first embodiment will be described in detail below with reference to the drawings.

Figure 2:
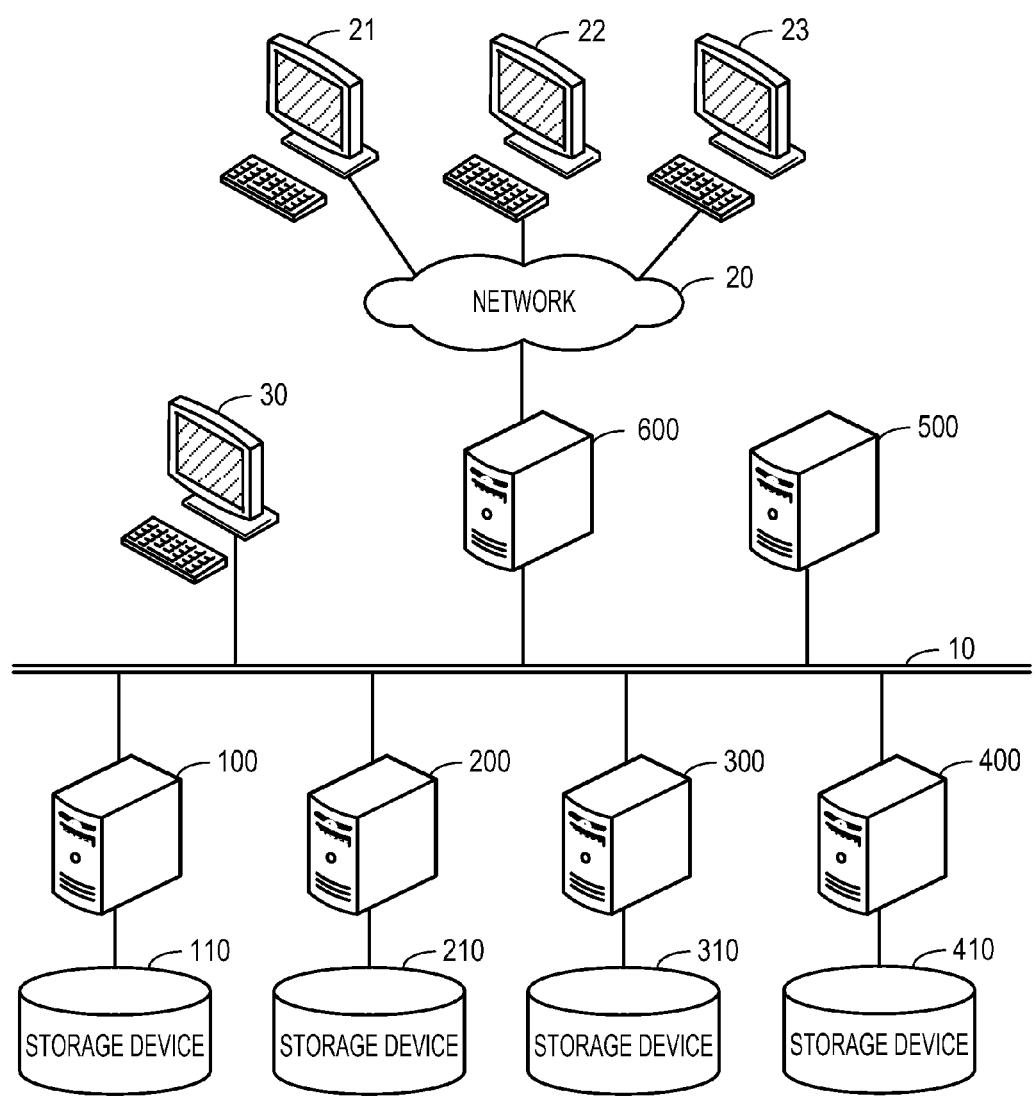
FIG. 2 illustrates a configuration of a distributed storage system according to a first embodiment.

FIG. 2 illustrates a configuration of a distributed storage system according to the first embodiment. The distributed storage system is a storage system in which reliability and processing performance are increased by arranging plural data having the same contents in plural storage nodes in a distributed manner, which are interconnected via a network.

In the distributed storage system illustrated in FIG. 2, the storage nodes 100, 200, 300 and 400, a control node 500, an access node 600, and a management node 30 are interconnected via a network 10. Further, terminal devices 21, 22 and 23 are connected to the access node via a network 20.

Storage devices 110, 210, 310 and 410 are connected respectively to the storage nodes 100, 200, 300 and 400. The storage nodes 100, 200, 300 and 400 manage respective data stored in the storage devices 110, 210, 310 and 410 connected thereto, and provide the data under the management to the access node 600 via the network 10. Also, the storage nodes 100, 200, 300 and 400 manage the data with redundancy. In other words, data having the same contents are managed by two storage nodes. Higher reliability is obtained by managing the data with redundancy in such a manner. The storage devices 110, 210, 310 and 410 are each, e.g., a disk array device that realizes RAID (Redundant Arrays of Independent Disks) by using a plurality of built-in HDDs (Hard Disk Drives).

The control node 500 manages the storage nodes 100, 200, 300 and 400. More specifically, the control node 500 holds therein a logical volume indicating the current status of the data arrangement. The control node 500 obtains information regarding the management of data from the storage nodes 100, 200, 300 and 400, and updates the logical volume as required. Further, when the logical volume is updated, the control node 500 notifies the details of the update to the storage nodes which are affected by the update of the logical volume. Details of the logical volume will be described later.

The access node 600 provides, to the terminal devices 21, 22 and 23, information processing service utilizing the data managed by the storage nodes 100, 200, 300 and 400. More specifically, the access node 600 executes a predetermined program in response to a request from the terminal devices 21, 22 and 23 and accesses the storage nodes 100, 200, 300 and 400 as required. Here, the access node 600 obtains the logical volume from the control node 500 and specifies the storage node, which is to be accessed, based on the obtained logical volume.

The management node 30 is a terminal device operated by an administrator of the distributed storage system. By operating the management node 30, the administrator can access the storage nodes 100, 200, 300 and 400, the control node 500, and the access node 600 to execute various settings that are necessary for the operations.

Figure 3:
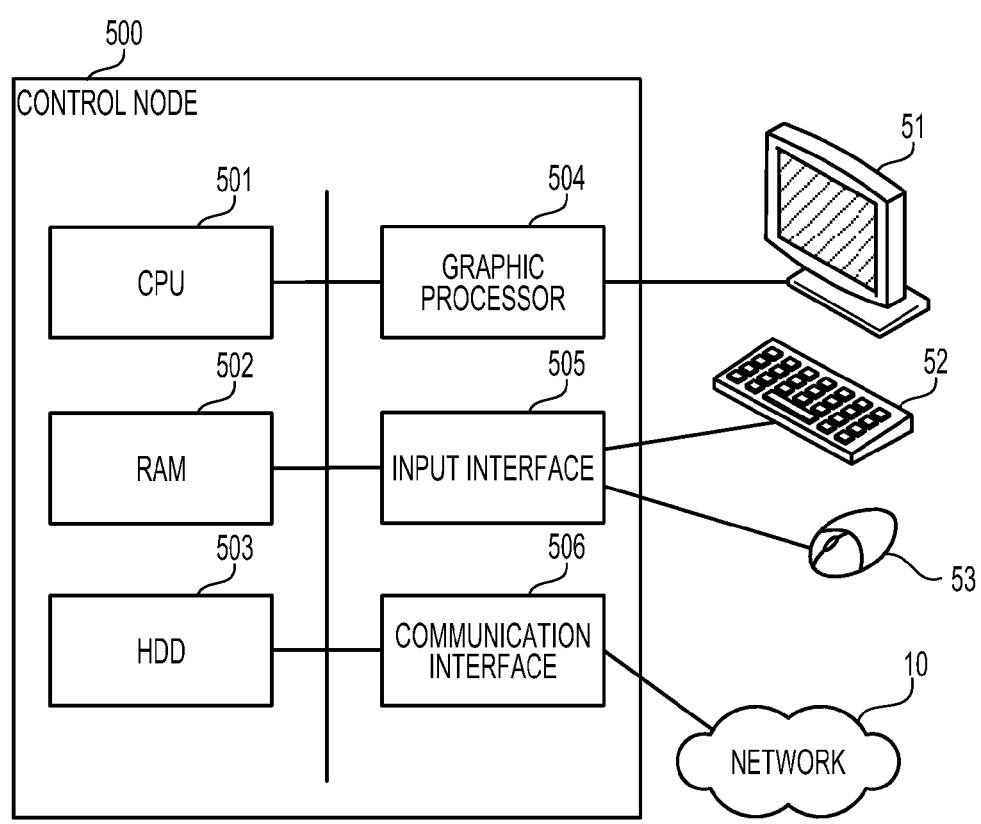
FIG. 3 illustrates a hardware configuration of a control node according to the first embodiment.

FIG. 3 illustrates a hardware configuration of the control node according to the first embodiment. The control node 500 includes a CPU (Central Processing Unit) 501, a RAM (Random Access Memory) 502, a HDD 503, a graphic processor 504, an input interface 505, and a communication interface 506.

The CPU 501 controls the entire operation of the control node 500.

The RAM 502 temporarily stores at least part of OS programs and programs of application software (hereinafter referred to simply as "applications"), which are to be executed by the CPU 501. The RAM 502 further stores various data necessary for the processing executed by the CPU 501.

The HDD 503 stores the OS programs and the application programs. The HDD 503 further stores various data necessary for the processing executed by the CPU 501. Another type of nonvolatile storage device, such as an SSD (Solid State Drive), can also be used instead of the HDD 503.

The graphic processor 504 is connected to a monitor 51. The graphic processor 504 displays an image on a screen of the monitor 51 in accordance with an instruction from the CPU 501.

The input interface 505 is connected to a keyboard 52 and a mouse 53. The input interface 505 transmits signals sent from the keyboard 52 and the mouse 53 to the CPU 501.

The communication interface 506 is connected to the network 10 and transmits and receives data with respect to the storage nodes 100, 200, 300 and 400, the control node 500, and the access node 600.

The storage nodes 100, 200, 300 and 400, the access node 600, the management node 30, and the terminal devices 21, 22 and 23 can be each constructed in a similar hardware configuration to that of the control node 500. However, the storage nodes 100, 200, 300 and 400 additionally include HDD interfaces for connection to the storage devices 110, 210, 310 and 410. The access node 600 further includes a communication interface for connection to the network 20 in addition to the communication interface for connection to the network 10.

The logical volume provided to the access node 600 by the control node 500 will be described below. The logical volume is a virtual volume for enabling the data, which are managed by the storage nodes 100, 200, 300 and 400 in a distributed manner, to be easily utilized from the access node 600.

Figure 4:
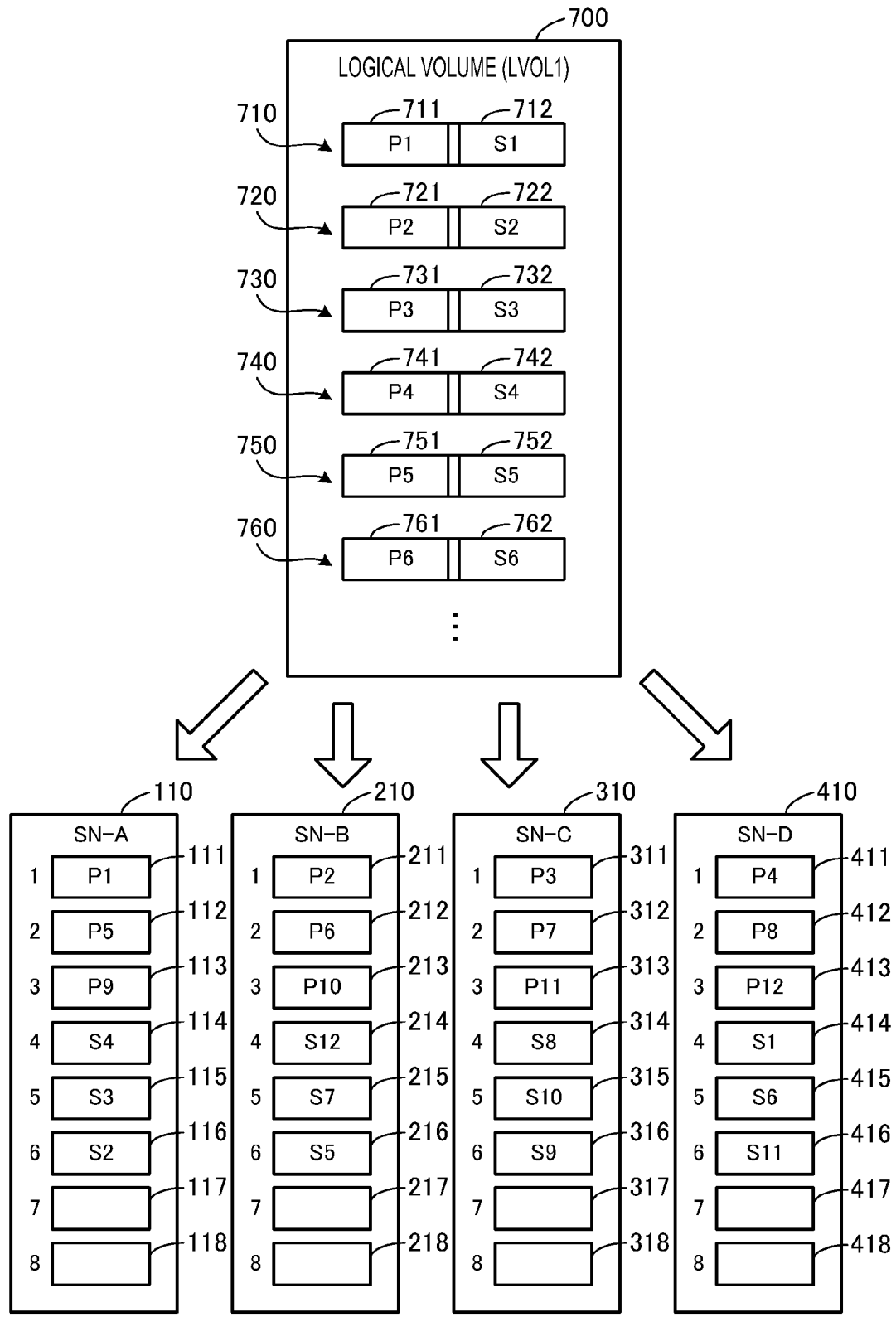
FIG. 4 illustrates an example of a first data structure of a logical volume according to the first embodiment.

FIG. 4 illustrates an example of a first data structure of the logical volume according to the first embodiment. A logical volume 700 is assigned with a logical volume ID (IDentifier) of "LVOL1". The storage nodes 100, 200, 300 and 400 are assigned with node IDs of "SN-A", "SN-B", "SN-C" and "SN-D", respectively.

A logical disk according to RAID5, for example, is constructed in each of the storage devices 110, 210, 310 and 410 which are connected to the storage nodes 100, 200, 300 and 400, respectively. The logical disk is divided into eight slices which are managed in each storage node in a unified way.

A storage area in the storage device 110 is divided into eight slices 111 to 118. A storage area in the storage device 210 is divided into eight slices 211 to 218. A storage area in the storage device 310 is divided into eight slices 311 to 318. A storage area in the storage device 410 is divided into eight slices 411 to 418.

The logical volume 700 is constructed in units of segments 710, 720, 730, 740, 750, 760, etc. The segments 710, 720, 730, 740, 750, 760, etc. are constructed by respective pairs of primary slices 711, 721, 731, 741, 751, 761, etc. and secondary slices 712, 722, 732, 742, 752, 762, etc.

In FIG. 4, a slice ID is expressed in combination of an alphabet "P" or "S" and a numeral. "P" represents that the relevant slice is a primary slice (i.e., a slice for storing the main data). "S" represents that the relevant slice is a secondary slice (i.e., a slice for storing the sub-data). The numeral subsequent to the alphabet represents to what number of segment the relevant slice belongs. For example, the primary slice 711 in the first segment 710 is denoted by "P1", and the secondary slice 712 therein is denoted by "S1". The same data is stored in both the slices "P1" and "S1" to ensure redundancy of data.

Each of the primary slices and the secondary slices in the logical volume 700 having the above-described structure is made correspondent to one of the slices in the storage devices 110, 210, 310 and 410. For example, the primary slice 711 in the first segment 710 is made correspondent to the slice 111 in the storage device 110, and the secondary slice 712 therein is made correspondent to the slice 414 in the storage device 410.

The storage devices 110, 210, 310 and 410 store data held in the primary slice and the secondary slice, which are made correspondent to their own slices. The logical volume can be prepared plural depending on the use of data, the authority of an access source, etc. Because slices not appearing on the logical volume cannot be recognized from the access node 600, using separate logical volumes as required contributes to improving security.

Figure 5:
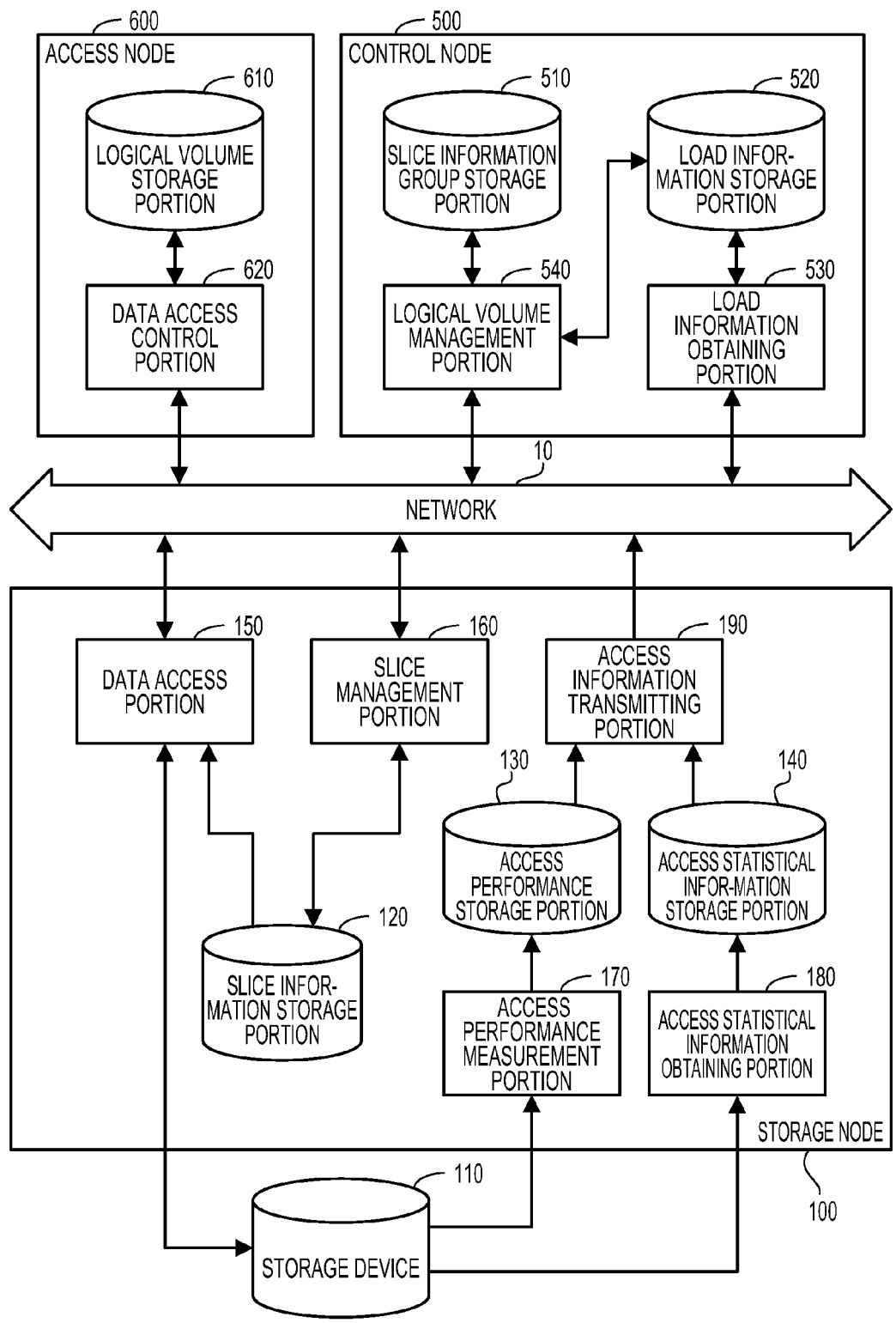
FIG. 5 is a block diagram illustrating a functional configuration of various nodes according to the first embodiment.

FIG. 5 is a block diagram illustrating a functional configuration of various nodes according to the first embodiment. The storage node 100 includes a slice information storage portion 120, an access performance storage portion 130, an access statistical information storage portion 140, a data access portion 150, a slice management portion 160, an access performance measurement portion 170, an access statistical information obtaining portion 180, and an access information transmitting portion 190.

The slice information storage portion 120 stores slice information regarding slices prepared in the storage device 110. The slice information includes, e.g., an address for specifying each slice, and a type (i.e., a primary slice or a secondary slice) assigned to each slice. The slice information further includes, for each slice, information regarding the storage node that manages the corresponding slice (i.e., the secondary slice corresponding to the primary slice or the primary slice corresponding to the secondary slice), which belongs to the same segment of the logical volume.

The access performance storage portion 130 stores information indicating maximum access performance allowable in the storage device 110. The access performance is measured by the access performance measurement portion 170 in advance.

The access statistical information storage portion 140 stores access statistical information that is obtained by measuring the number of read accesses and the number of write accesses with respect to each slice in the storage device 110, and an operation time for each slice. The access statistical information is obtained by the access statistical information obtaining portion 180.

Upon receiving access from the access node 600, the data access portion 150 refers to the slice information stored in the slice information storage portion 120 and accesses the data stored in the storage device 110.

More specifically, upon receiving a data read request (Read request) from the access node 600 with designation of an address, the data access portion 150 determines whether the slice to which the designated address belongs is the primary slice. If it is the primary slice, the data access portion 150 obtains the data corresponding to the designated address from the storage device 110 and transmits the obtained data to the access node 600. If it is not the primary slice, the data access portion 150 notifies the access node 600 of the fact that the designation of the address is inadequate.

Upon receiving a data write request (Write request) from the access node 600 with designation of an address and write data, the data access portion 150 tries to write the data in a position within the storage device 110, which corresponds to the designated address. Then, the data access portion 150 notifies the write result to the access node 600.

Further, if the slice to which the designated address belongs is the primary slice, the data access portion 150 instructs the storage node, which manages the corresponding secondary slice, to write the data in the corresponding secondary slice in a similar manner. As a result, the contents of the primary slice and the contents of the secondary slice are maintained the same.

Moreover, when the slice information stored in the slice information storage portion 120 is updated, the data access portion 150 transmits the slice information to the storage nodes 200, 300 and 400 via the network 10, thereby changing the slice arrangement to a state after the update.

The slice management portion 160 periodically notifies the operating status of the storage node 100 to the control node 500. Also, upon receiving a request for obtaining the slice information from the control node 500, the slice management portion 160 transmits the slice information stored in the slice information storage portion 120. Further, upon receiving an instruction to update the slice information, the slice management portion 160 reflects the details of the instructed update on the slice information stored in the slice information storage portion 120.

The access performance measurement portion 170 measures the maximum access performance of the storage device 110 and stores the measured result in the access performance storage portion 130. The access performance measurement portion 170 measures the access performance, for example, at startup of the storage node 100 or the storage device 110, or at initialization of the entire system. The access performance measurement portion 170 measures, as the access performance, "iops" resulting when a maximum load is applied to the storage device 110.

The access statistical information obtaining portion 180 obtains the number of read accesses and the number of write accesses, which have been made by the data access portion 150 with respect to the storage device 110. Also, the access statistical information obtaining portion 180 records a total time corresponding to the obtained number of accesses. The access statistical information obtaining portion 180 stores thus-obtained access statistical information in the access statistical information storage portion 140.

The access information transmitting portion 190 transmits the access performance information stored in the access performance storage portion 130 and the access statistical information stored in the access statistical information storage portion 140 (those both types of information being collectively referred to as "access information" hereinafter) to the control node 500. The access information transmitting portion 190 transmits the access information in response to a request from the control node 500 or periodically.

The storage nodes 200, 300 and 400 can also be each constructed in the same functional configuration as that of the storage node 100.

The control node 500 includes a slice information group storage portion 510, a load information storage portion 520, a load information obtaining portion 530, and a logical volume management portion 540.

The slice information group storage portion 510 stores the slice information managed by the storage nodes 100, 200, 300 and 400. The slice information stored in the slice information group storage portion 510 is provided by collecting the information held in the storage nodes 100, 200, 300 and 400.

The load information storage portion 520 stores load information indicating respective loads applied to the slices of the storage nodes 100, 200, 300 and 400. The load information is generated by the load information obtaining portion 530 and is stored in the load information storage portion 520.

The load information obtaining portion 530 receives the access information from the storage nodes 100, 200, 300 and 400. The load information obtaining portion 530 evaluates the load for each of the slices of the storage nodes 100, 200, 300 and 400 based on the received access information. Details of a load evaluation method executed by the load information obtaining portion 530 will be described later.

The logical volume management portion 540 receives notices, each indicating the operating status, from the storage nodes 100, 200, 300 and 400 via the network 10. By receiving the notices, the logical volume management portion 540 recognizes whether the storage nodes are each normally operating. As required, the logical volume management portion 540 receives the slice information from the storage nodes 100, 200, 300 and 400, and then updates the slice information stored in the slice information group storage portion 510. Further, the logical volume management portion 540 prepares a logical volume, which is to be stored in the access node 600, based on the slice information stored in the slice information group storage portion 510.

In addition, the logical volume management portion 540 updates the slice information and the logical volume when any of the storage nodes 100, 200, 300 and 400 has failed or is stopped.

More specifically, the logical volume management portion 540 changes the secondary slice, which corresponds to the primary slice arranged in a stop target node, to the primary slice. Then, the logical volume management portion 540 specifies, from among vacant slices in any of the storage nodes under operation, a secondary slice that corresponds to the primary slice after the change. Further, the logical volume management portion 540 assigns the specified slice to the corresponding secondary slice and updates the slice information and the logical volume.

At that time, the logical volume management portion 540 refers to the load information stored in the load information storage portion 520 and tries to level the loads of the storage nodes under operation. More specifically, the logical volume management portion 540 tentatively assigns the slice, which has been newly assigned as the primary slice, to each of the plurality of storage nodes. Then, the logical volume management portion 540 evaluates respective loads of the storage nodes to which the relevant slice has been tentatively assigned. The logical volume management portion 540 sets, as an actual data arrangement destination, one of the storage nodes tentatively assigned with the relevant slice, which has a minimum load among the loads of the storage nodes having been evaluated after the tentative assignment of the relevant slice. Thereafter, the logical volume management portion 540 updates the slice information and the logical volume.

The logical volume management portion 540 transmits, to the storage nodes under operation, the slice information indicating the slice configuration after the update.

The access node 600 includes a logical volume storage portion 610 and a data access control portion 620.

The logical volume storage portion 610 stores management information of the logical volume (hereinafter referred to as "logical volume management information"). In the logical volume management information, each segment is managed using a logical address, which is a virtual address, in order to handle the storage areas managed by the storage devices 110, 210, 310 and 410 in a unified manner. The logical volume management information contains the logical address for specifying each segment, and information for specifying the primary slice and the secondary slice, which belong to each segment. The logical volume management information is prepared and updated by the control node 500.

Upon receiving a data access request from a program under execution, the data access control portion 620 first confirms whether the logical volume management information is stored in the logical volume storage portion 610. If the logical volume management information is not stored in the logical volume storage portion 610, the data access control portion 620 obtains the logical volume management information from the control node 500 and stores the logical volume management information in the logical volume storage portion 610.

Then, the data access control portion 620 specifies the storage node, which is to be the access destination, based on the logical volume management information. In other words, the data access control portion 620 specifies the segment to which the data to be utilized belongs, and further specifies the storage node that manages the primary slice in the specified segment. Thereafter, the data access control portion 620 accesses the specified storage node.

If the access has failed, it is thought that the status of the data arrangement has changed after obtaining the logical volume management information from the control node 500. Therefore, the data access control portion 620 obtains the latest logical volume from the control node 500 and retries access to the storage node.

Figure 6:
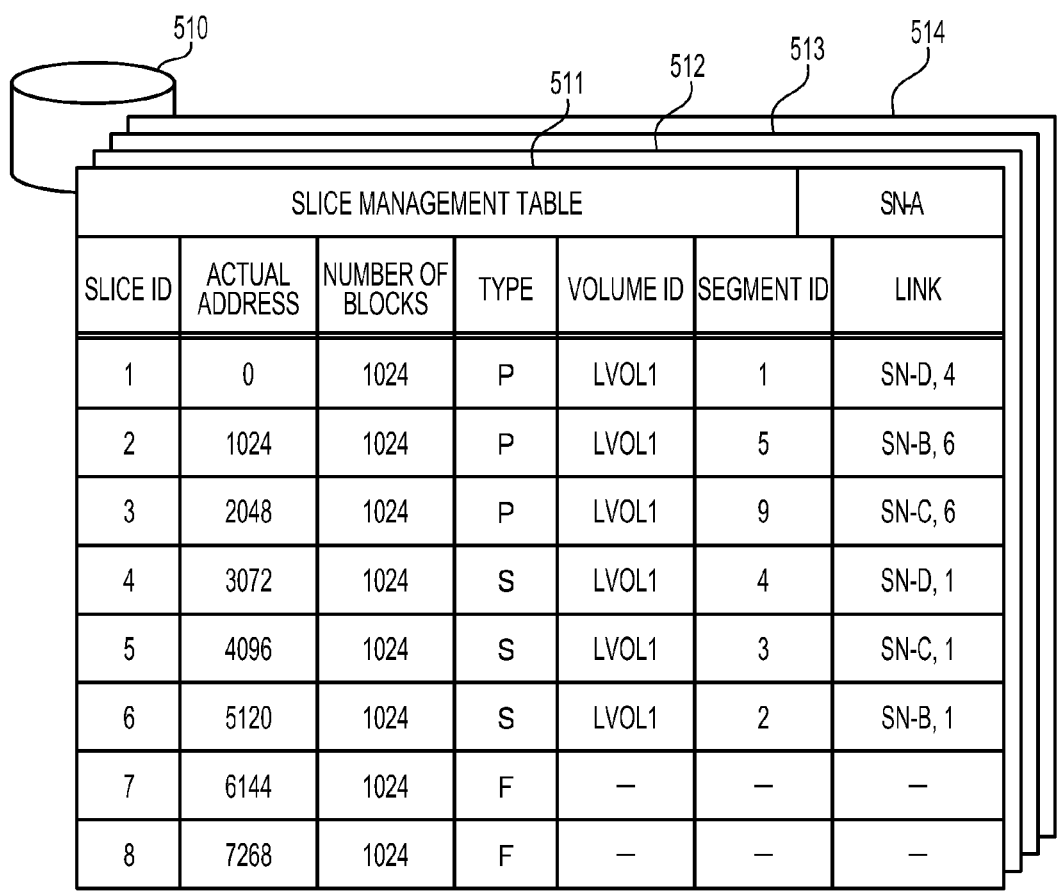
FIG. 6 illustrates an example of a data structure of a slice management table according to the first embodiment.

FIG. 6 illustrates an example of a data structure of a slice management table according to the first embodiment. Slice management tables 511, 512, 513 and 514 are stored in the slice information group storage portion 510 of the control node 500. The slice management tables 511, 512, 513 and 514 hold therein the slice information for managing the slices of the storage nodes 100, 200, 300 and 400. The slice management tables 511, 512, 513 and 514 are also held in the storage nodes 100, 200, 300 and 400, respectively. Further, the slice management tables 511, 512, 513 and 514 are synchronized between the control node 500 and the storage nodes 100, 200, 300 and 400 depending on the change of the slice arrangement.

The slice management table 511 includes an item of "slice ID", an item of "actual address", an item of "number of blocks", an item of "type", an item of "volume ID", an item of "segment ID", and an item of "link". Those items of information arranged in the horizontal direction are correlated with each other and represent the slice information for one slice.

The item of "slice ID" sets therein the slice ID. The item of "actual address" sets therein a physical address representing a head block of the slice. The item of "number of blocks" sets therein the number of blocks included in the slice. The item of "type" sets therein any one of "P" (Primary), "S" (Secondary), and "F" (Free). "P" means the primary slice, "S" means the secondary slice, and "F" means that the relevant slice is not made correspondent to any segment. The item of "volume ID" sets therein a logical volume ID of the logical volume to which the segment made correspondent to the slice belongs. The item of "segment ID" sets therein a segment ID of the segment which is made correspondent to the slice.

The item of "link" sets therein, for the slice having the type "P", an ID of the storage node and an ID of the slice in which the corresponding secondary slice is arranged. Also, the item of "link" sets therein, for the slice having the type "S", an ID of the storage node and an ID of the slice in which the corresponding primary slice is arranged.

For example, one row of the slice management table 511 stores the slice information of the slice ID being "1", the actual address being "0", the number of blocks being "1024", the type being "P", the volume ID being "LVOL1", the segment ID being "1", and the link being "SN-D,4".

The above slice information indicates that the primary slice in the first segment of the logical volume "LVOL1" is assigned to the areas from block 0 to block 1023, which are managed by the storage node 100. Further, the above slice information indicates that the secondary slice corresponding to the relevant primary slice is assigned to the fourth slice of the storage node "SN-D".

Figure 7:
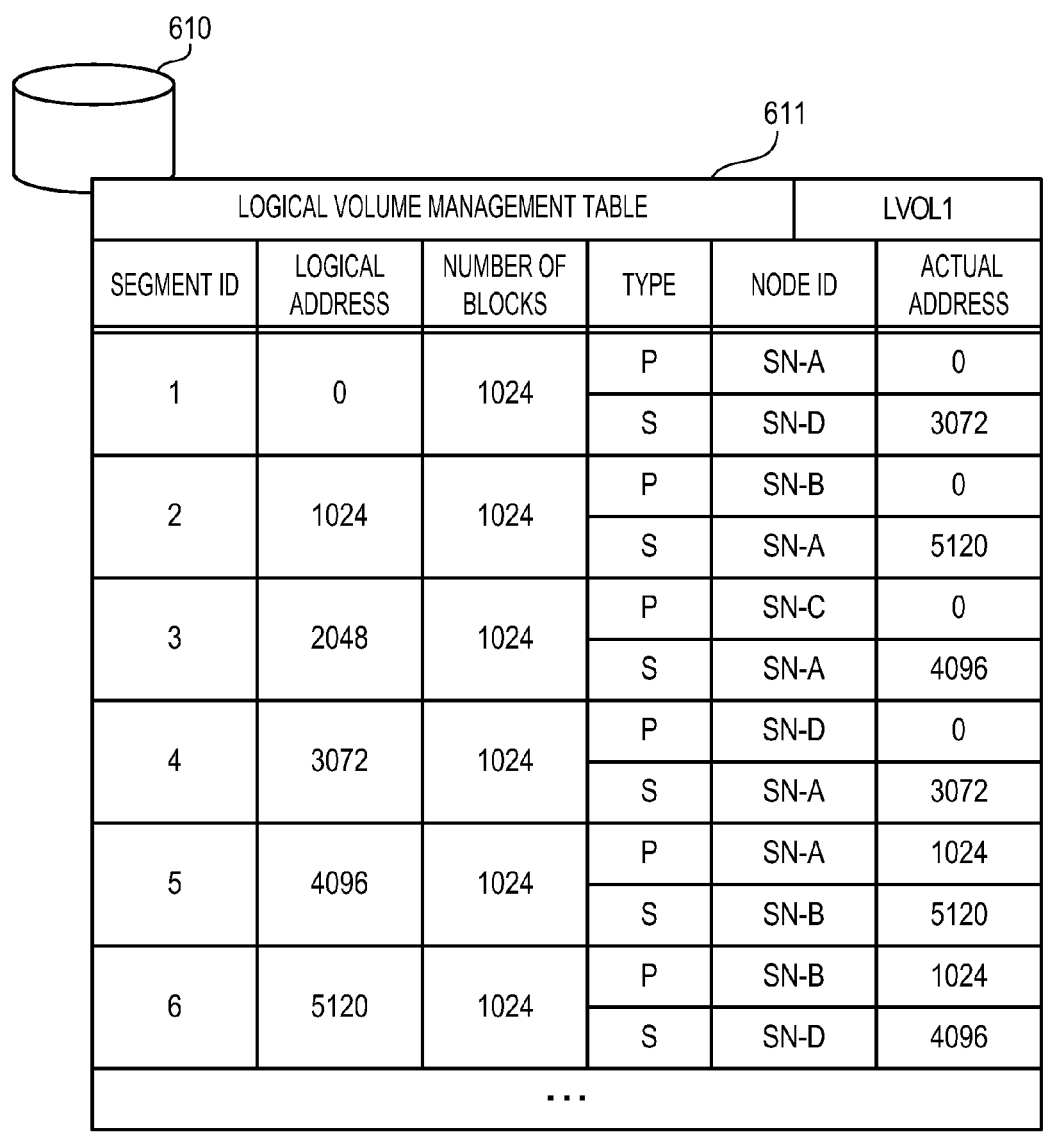
FIG. 7 illustrates an example of a data structure of a logical volume management table according to the first embodiment.

FIG. 7 illustrates an example of a data structure of a logical volume management table according to the first embodiment. A logical volume management table 611 is stored in the logical volume storage portion 610. The logical volume management table 611 is a table regarding the logical volume "LVOL1".

The logical volume management table 611 includes an item of "segment ID", an item of "logical address", an item of "number of blocks", an item of "type", an item of "node ID", and an item of "actual address". Those items of information arranged in the horizontal direction are correlated with each other.

The item of "segment ID" sets therein the segment ID for identifying the segment. The item of "logical address" sets therein a virtual address on the logical volume, which represents a head block of the segment. The item of "number of blocks" sets therein the number of blocks included in the segment.

The item of "type" sets therein any one of "P" and "S". The item of "node ID" sets therein the node ID for identifying the storage node that is the assignment destination. The item of "actual address" sets therein a physical address representing a head block of the slice that is the assignment destination.

The information stored in the logical volume management table 611 is generated by the logical volume management portion 540 based on the slice information that is stored in the slice information group storage portion 510 of the control node 500.

Figure 8:
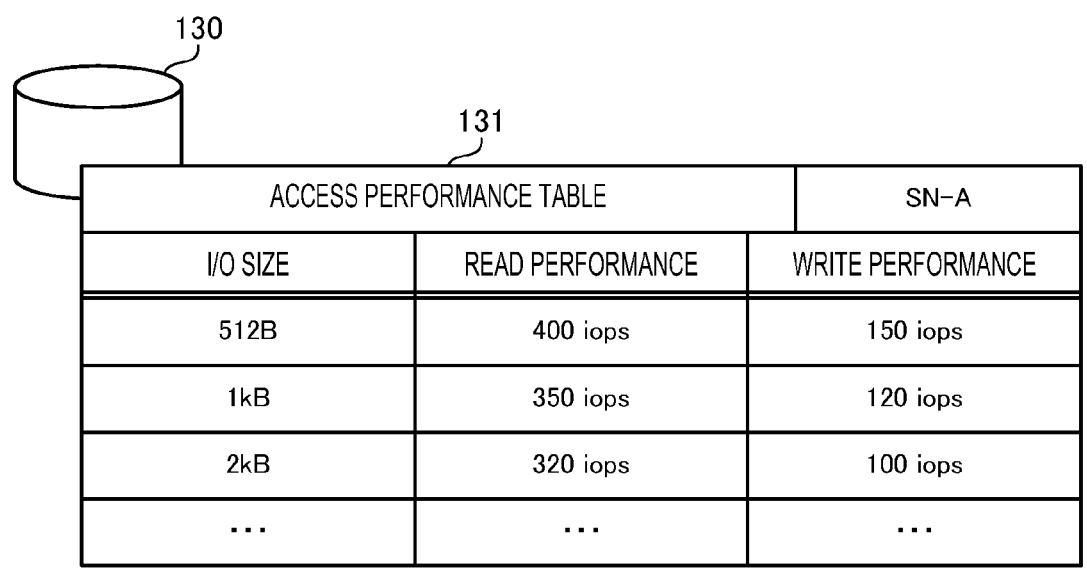
FIG. 8 illustrates an example of a data structure of an access performance table according to the first embodiment.

FIG. 8 illustrates an example of a data structure of an access performance table according to the first embodiment. An access performance table 131 is generated by the access performance measurement portion 170 and is stored in the access performance storage portion 130. The access performance table 131 is made correspondent to the node ID "SN-A" of the storage node 100. The access performance table 131 includes an item of "I/O (Input/Output) size", an item of "read performance", and an item of "write performance". Those items of information arranged in the horizontal direction are correlated with each other and represent the access performance at one I/O size.

The item of "I/O size" sets therein the data size that is a unit of access to the storage device 110. The item of "read performance" sets therein the maximum read performance at the relevant I/O size. The item of "write performance" sets therein the maximum write performance at the relevant I/O size.

The access performance table 131 sets therein information indicating, for example, that the I/O size is "512 B (Byte)", the read performance is "400 iops", and the write performance is "150 iops".

The read performance and the write performance can be measured by the access performance measurement portion 170, for example, in accordance with the benchmark software for generating reads and writes at a predetermined I/O size with respect to the storage device 110.

FIG. 9 illustrates an example of a data structure of an access statistical table according to the first embodiment. Access statistical tables 141, 142, 143, etc. are obtained by the access statistical information obtaining portion 180 and are stored in the access statistical information storage portion 140. The access statistical tables 141, 142, 143, etc. are each obtained per slice of the storage node 100. The access statistical tables 141, 142, 143, etc. are each made correspondent to the node ID "SN-A" and each slice ID. Although the access statistical table 141 will be described below, the other access statistical tables 142, 143, etc. also have a similar structure.

The access statistical table 141 includes an item of "I/O size", an item of "lapsed time", an item of "number of read IOs", and an item of "number of write IOs". Those items of information arranged in the horizontal direction are correlated with each other and represent the access statistics at one I/O size.

The item of "I/O size" sets therein the data size that is a unit of access to the storage device 110. The item of "lapsed time" sets the time lapsed from the start of operation of taking the statistics. The item of "number of read IOs" sets therein the number of read IOs that have occurred on the storage device 100 from the start of operation of taking the statistics. The item of "number of write IOs" sets therein the number of write IOs that have occurred on the storage device 100 from the start of operation of taking the statistics.

The access statistical table 141 sets therein information indicating, for example, that the I/O size is "512 B", the lapsed time is "30 hours", the number of read IOs is "502300", and the number of write IOs is "250100".

The load information obtaining portion 530 generates the load information based on the access information obtained from the storage nodes 100, 200, 300 and 400. At that time, the load information obtaining portion 530 can evaluate the load for each of the slices of the storage nodes 100, 200, 300 and 400 from the following formula (1):

$$L_i = \sum_j \left( \frac{r_{ij}}{t} \cdot \frac{1}{R_j} + \frac{w_{ij}}{t} \cdot \frac{1}{W_j} \right) \quad (1)$$

In the above formula (1), $L_i$ (i=1, 2, 3, . . . , 8) represents the load per slice. The suffix i corresponds to the slice ID. Also, j is a suffix corresponding to the I/O size. Specifically, j takes 1, 2, 3, etc. (i.e., j=1, 2, 3, etc.). For example, j=1 corresponds to 512 B of the I/O size, and j=2 corresponds to 1 kB (Kilo Byte) of the I/O size.

Further, $r_{ij}$ represents the number of read IOs for the relevant slice at the relevant I/O size. For example, $r_{11}$=502300 is provided for the I/O size of "512 B" (j=1) in the access statistical table 141 (i=1).

Still further, $w_{ij}$ represents the number of write IOs for the relevant slice at the relevant I/O size. For example, $w_{11}$=250100 is provided.

Still further, t represents the time (sec) lapsed from the start of operation of taking the statistics. In the access statistical table 141, for example, the lapsed time is "30" hours, i.e., t=10800 sec in terms of seconds.

$R_j$ represents the read performance in the relevant storage node at the relevant I/O size. For example, $R_1$=400 iops is provided for the I/O size of "512 B" (j=1) in the access performance table 131.

$W_j$ represents the write performance in the relevant storage node at the relevant I/O size. For example, $W_1$=150 iops is provided.

Thus, the load information obtaining portion 530 can evaluate the loads of respective slices of the storage nodes 100, 200, 300 and 400 based on both the access information obtained from the storage nodes 100, 200, 300 and 400 and the formula (1). By using the formula (1), the load can be evaluated as a proportion of the access frequency, which has actually occurred, with respect to the maximum access performance.

Figure 10:
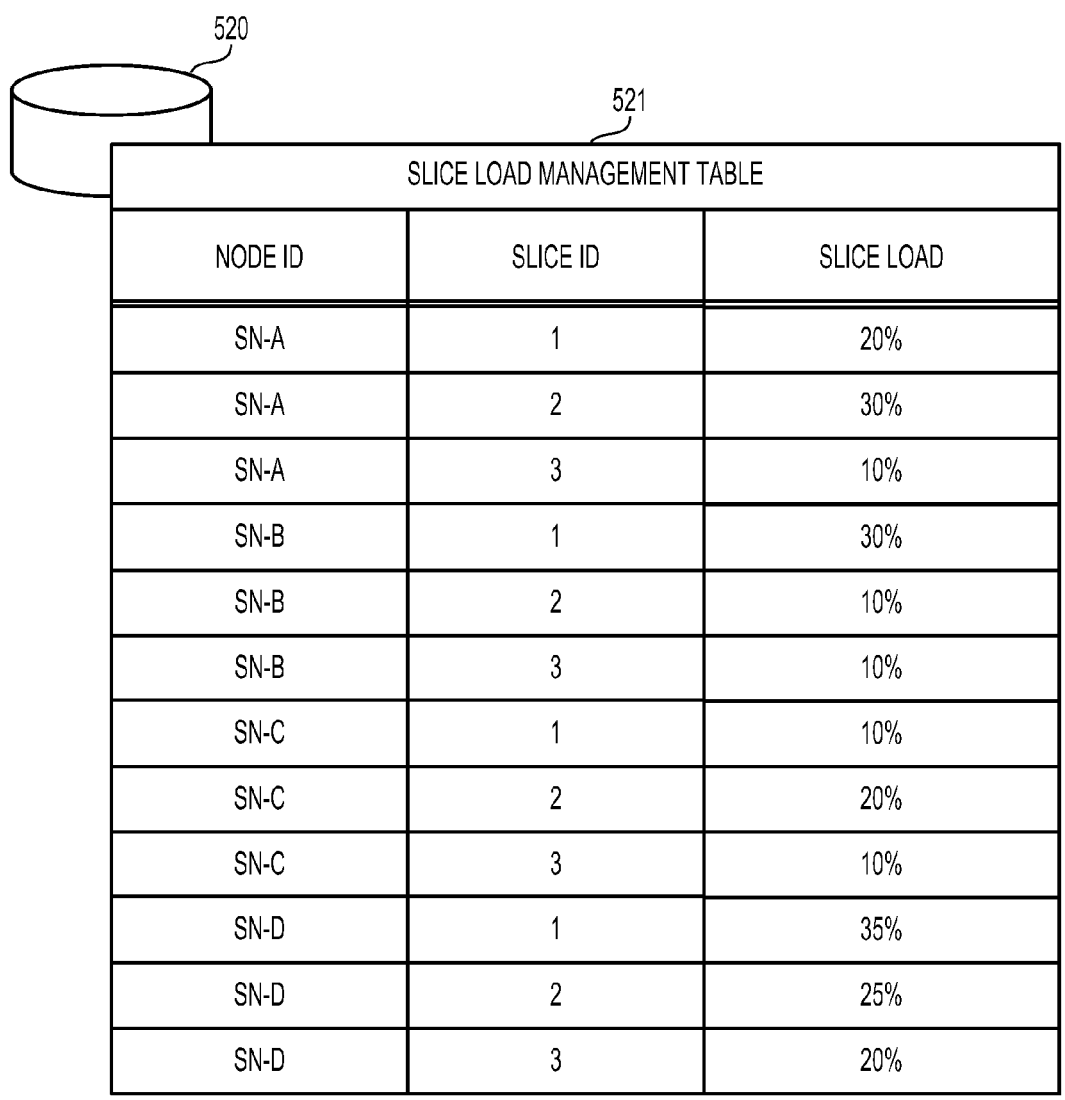
FIG. 10 illustrates an example of a data structure of a slice load management table according to the first embodiment.

FIG. 10 illustrates an example of a data structure of a slice load management table according to the first embodiment. A slice load management table 521 is generated by the load information obtaining portion 530 and is stored in the load information storage portion 520. The slice load management table 521 includes an item of "node ID", an item of "slice ID", and an item of "slice load". Those items of information arranged in the horizontal direction are correlated with each other and represent information regarding the load of one slice.

The item of "node ID" sets therein the node ID. The item of "slice ID" sets therein the slice ID. The item of "slice load" sets therein information indicating the load of the relevant slice. The slice load is set, for example, as a value which is calculated by the load information obtaining portion 530 based on the formula (1) and which is expressed in terms of percentage.

The slice load management table 521 sets therein information indicating, for example, that the node ID is "SN-A", the slice ID is "1", and the slice load is "20%".

FIG. 11 illustrates an example of a data structure of a storage-node load management table according to the first embodiment. A storage-node load management table 522 is generated by the logical volume management portion 540 and is stored in the load information storage portion 520.

Herein, the storage-node load management table 522 illustrates the case where the storage node 400 has been disconnected from the distributed storage system because of, a failure, for example.

The storage-node load management table 522 includes an item of "node ID", an item of "load provided by slices which have already been assigned", and an item of "load provided by slices for which the assignment destination is under consideration". Those items of information arranged in the horizontal direction are correlated with each other and represent information regarding the load of one storage node.

The item of "node ID" sets therein the node ID.

The item of "load provided by slices which have already been assigned" sets therein a load of the relevant storage node, the load being provided by the primary slices which have already been assigned (i.e., the slices other than those for which change of the assignment destination is to be considered). For example, when there are slice IDs of "1", "2" and "3" representing the slices which have already been assigned, a total load provided by those three slices is set in the relevant item.

The item of "load provided by slices for which the assignment destination is under consideration" sets therein a load of the relevant storage node, the load being provided by the primary slices for which the assignment destination is under consideration. For example, when there are slice IDs of "4" and "5" representing the slices for which the assignment destination is under consideration, a total load provided by those two slices is set in the relevant item.

The storage-node load management table 522 sets therein information indicating, for example, that the node ID is "SN-A", the load provided by the slices which have already been assigned is "60%", and the load provided by the slices for which the assignment destination is under consideration is "35%".

The above-mentioned example represents the state where, because the storage node 400 has become not utilizable, "S4" which has so far been assigned to the slice 114 in the storage node 100 is changed to "P4". Stated another way, in the storage node 100, "P1", "P5" and "P9" have already been assigned respectively in the slices 111, 112 and 113. Hence, a total of the loads of the slices 111, 112 and 113 is set as the load provided by the slices which have already been assigned. More specifically, such a total load is obtained as ("20%"+ "30%"+"10%"="60%") according to the slice load management table 521.

The load estimated to generate in the slice 114, to which the primary slice "P4" is newly assigned, can be determined from the load that has occurred in the storage node 400. More specifically, the load of the slice 411 is "35%" according to the slice load management table 521. In that case, the load that is estimated to newly generate in the slice 114 of the storage node 100 can be evaluated as "35%". Therefore, "35%" is set in the item of "load provided by slices for which the assignment destination is under consideration". However, it is here assumed that the performances of the storage device 110, 210 and 310 are the same.

When the performances of the storage devices 110, 210 and 310 differ from each other, a weight may be taken into account depending on a performance ratio between two storage nodes. For example, the storage device 110 may have higher performance than the storage device 410 in a disk rotational speed, a mean seek time, etc. As one practical case, it is here assumed that a mean access time differs between the storage device 110 and the storage device 410 due to the above-mentioned difference in the performance, i.e., that the mean access time of the storage device 110 is a half the mean access time of the storage device 410. In such a case, "17.5%", i.e., ½ of the load of "35%" which has been measured for the slice 411, can be evaluated as a load that is newly imposed on the storage node 100.

The foregoing description is similarly applied to the load information set for the storage nodes 200 and 300.

Starting from the state after setting the load information as described above, the logical volume management portion 540 successively executes tentative assignment of the primary slices "P4", "P8" and "P12", which have so far been arranged in the storage node 400, and evaluates the loads that are estimated to generate in the storage nodes 100, 200 and 300.

FIG. 12 illustrates an example of a data structure of a tentative assignment management table according to the first embodiment. A tentative assignment management table 523 is generated by the logical volume management portion 540 and is stored in the load information storage portion 520. The tentative assignment management table 523 indicates the load of each slice in the state set in the storage-node load management table 522 (i.e., in the starting state of the tentative assignment). The tentative assignment management table 523 includes an item of "node ID", an item of "slice ID", an item of "slice load", and an item of "assignment flag". Those items of information arranged in the horizontal direction are correlated with each other and represent information regarding each slice in one storage node.

The item of "node ID" sets therein the node ID. The item of "slice ID" sets therein the slice ID. The item of "slice load" sets therein the load of the relevant slice. The item of "assignment flag" sets therein a flag indicating whether the relevant slice is one for which the arrangement destination has already been determined with the tentative assignment.

The tentative assignment management table 523 sets therein information indicating, for example, that the node ID is "SN-A", the slice ID is "1", the slice load is "20%", and the assignment flag is "set". In other words, the arrangement destination is not changed for the slice 111.

Also, the tentative assignment management table 523 sets therein information indicating, for example, that the node ID is "SN-A", the slice ID is "4", the slice load is "35%", and the assignment flag is "not yet set". In other words, the information indicates that it is required to try change of the arrangement destination with the tentative assignment for "P4" which has been newly assigned to the slice 114.

Figure 13:
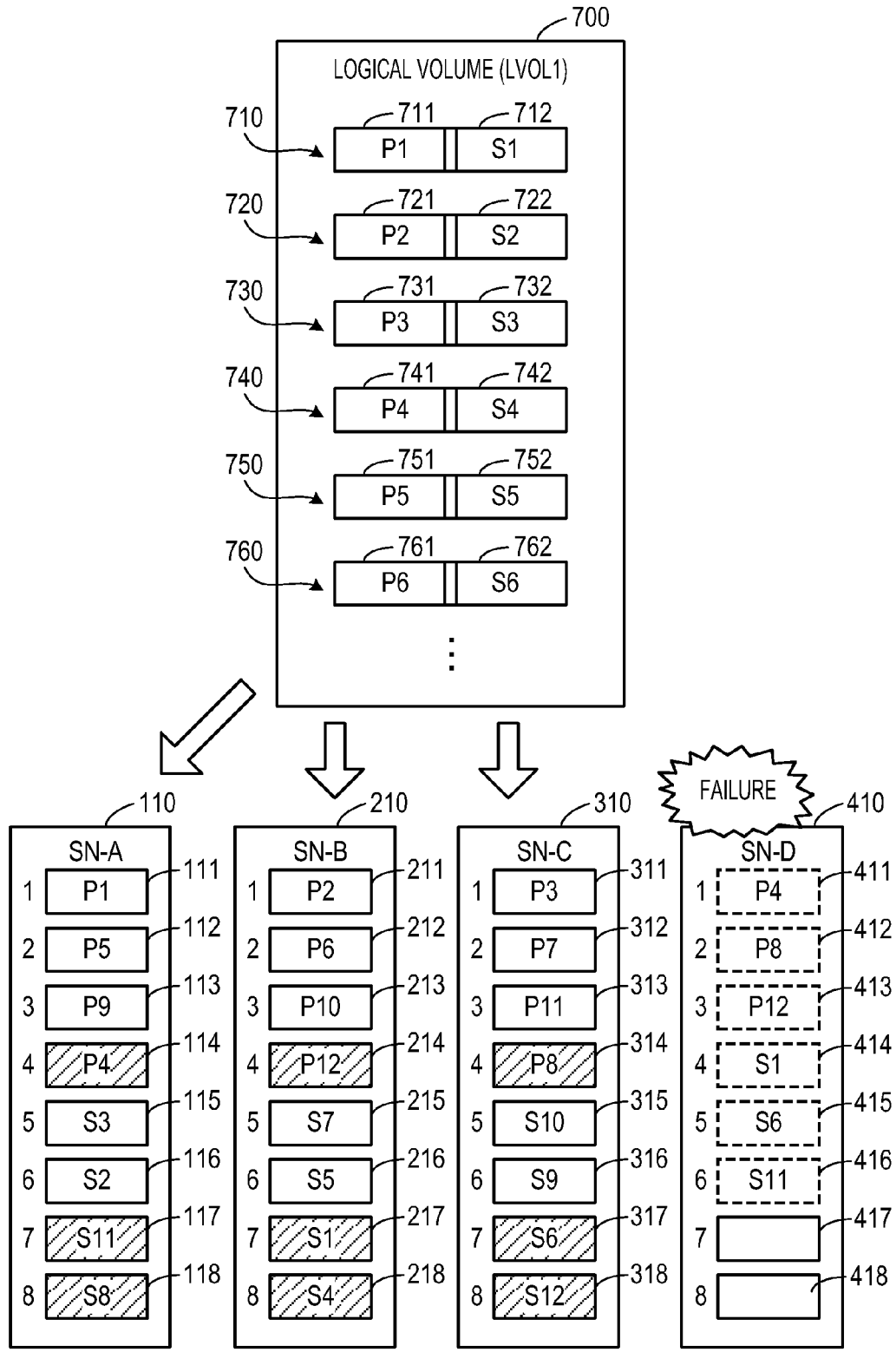
FIG. 13 illustrates an example of a second data structure of the logical volume according to the first embodiment.

FIG. 13 illustrates an example of a second data structure of the logical volume according to the first embodiment. FIG. 13 illustrates the case where the storage node 400 has been disconnected from the distributed storage system because of a failure. When the storage node 400 is disconnected, the logical volume management portion 540 changes the logical volume into such a state as illustrated in FIG. 13.

First, the logical volume management portion 540 assigns the roles of the primary slices and the secondary slices, which have been arranged in the storage node 400, to the storage nodes 100, 200 and 300.

More specifically, the role of "P4" in the slice 411 is taken over by "S4" which has so far been assigned to the slice 114, and "S4" in the slice 114 is changed to "P4". Also, the role of "P8" in the slice 412 is taken over by "S8" which has so far been assigned to the slice 314, and "S8" in the slice 314 is changed to "P8". Further, the role of "P12" in the slice 413 is taken over by "S12" which has so far been assigned to the slice 214, and "S12" in the slice 214 is changed to "P12".

"S1" in the slice 414 is assigned to the slice 217, which has so far been a vacant slice, such that the role of the slice 414 is taken over by the slice 217. Also, "S6" in the slice 415 is assigned to the slice 317, which has so far been a vacant slice, such that the role of the slice 415 is taken over by the slice 317. Further, "S11" in the slice 416 is assigned to the slice 117, which has so far been a vacant slice, such that the role of the slice 416 is taken over by the slice 117.

In addition, secondary slices corresponding to the slices 114, 214 and 314, which are newly made correspondent to the primary slices, are arranged in the storage nodes 100, 200 and 300. At that time, it is assumed that "S4" is arranged in the slice 218, which has so far been a vacant slice, with respect to "P4" in the slice 114. Further, it is assumed that "S12" is arranged in the slice 318, which has been so far a vacant slice, in a pair with "P12" in the slice 214, and that "S8" is arranged in the slice 118, which has so far been a vacant slice, in a pair with "P8" in the slice 314.

Details of the processing executed by the control node 500 in the above-described configuration will be described below. Be it noted that, until reaching the time at which the state illustrated in FIG. 13 is established, the logical volume management portion 540 has generated the storage-node load management table 522 and the tentative assignment management table 523.

Figure 14:
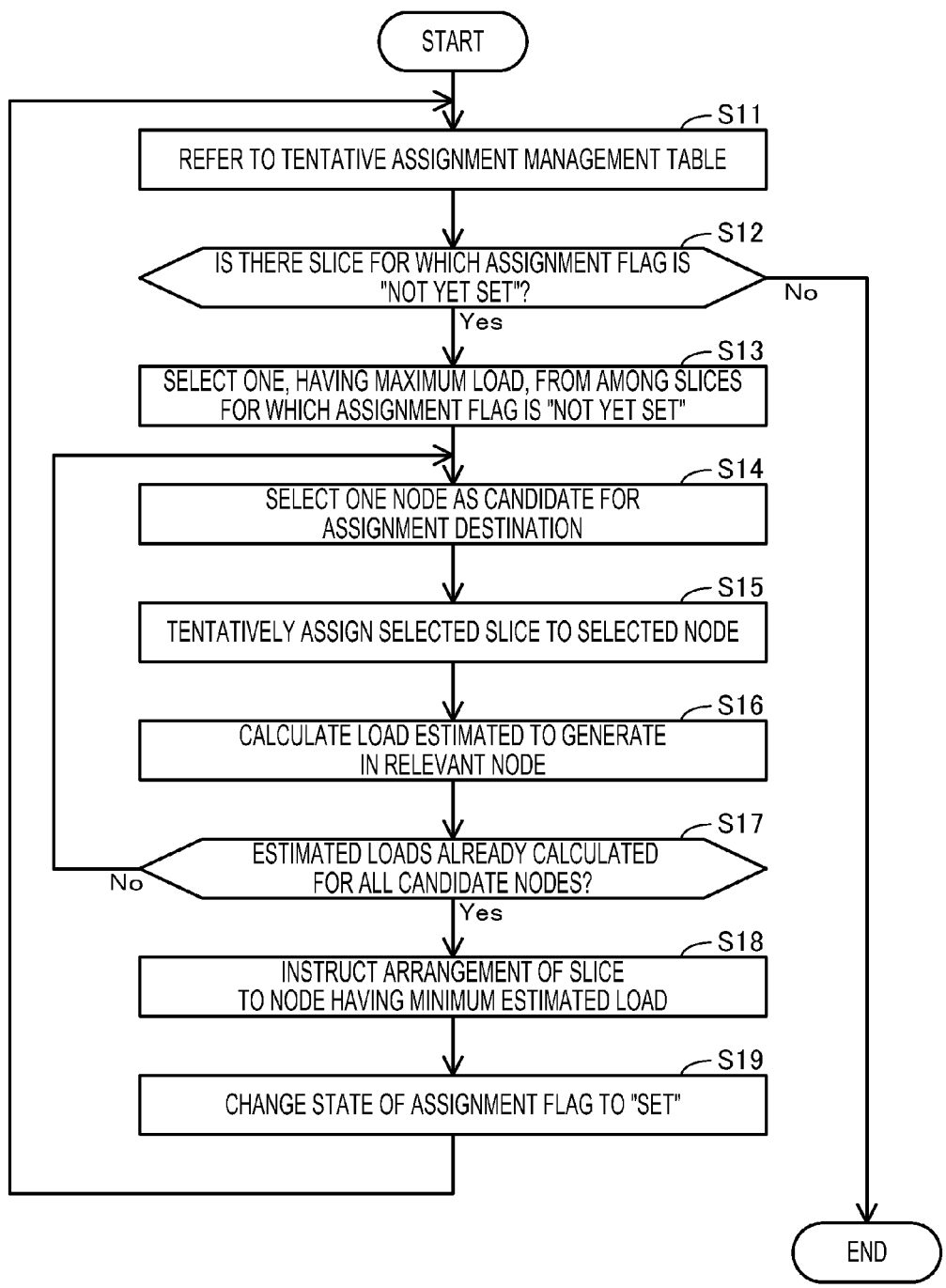
FIG. 14 is a flowchart illustrating procedures of a rearrangement process according to the first embodiment.

FIG. 14 is a flowchart illustrating procedures of a rearrangement process according to the first embodiment. The processing illustrated in FIG. 14 will be described below following step numbers.

[Step S11] The logical volume management portion 540 refers to the tentative assignment management table 523 stored in the load information storage portion 520.

[Step S12] The logical volume management portion 540 determines whether the tentative assignment management table 523 includes the slice for which the assignment flag is "not yet set". If that slice is present, the processing is shifted to step S13. If that slice is not present, the processing is brought to an end.

[Step S13] The logical volume management portion 540 selects one, having a maximum slice load, from among the slices for which the assignment flag is "not yet set". In the tentative assignment management table 523 illustrated in FIG. 12, the slice 114 having a maximum slice load ("35%") is selected from among the slices for which the assignment flag is "not yet set".

[Step S14] The logical volume management portion 540 selects one storage node to which the selected slice is tentatively assigned. Herein, the logical volume management portion 540 selects the storage node, to which the selected slice is tentatively assigned, such that the selected primary slice and the secondary slice corresponding to the former will not belong to the same storage node. For example, when "P4" is tentatively assigned, the storage node 200 in which "S4" is arranged is excluded from the target to be selected by the logical volume management portion 540. In the state illustrated in FIG. 13, for example, the storage nodes 100 and 300 are set as candidates for the arrangement destination, and one of those two storage nodes is selected as the storage node to which "P4" is tentatively assigned.

[Step S15] The logical volume management portion 540 tentatively assigns the slice, which has been selected in step S13, to the storage node which has been selected in step S14.

[Step S16] The logical volume management portion 540 calculates a load that is estimated to generate in the storage node to which the selected slice has been assigned. For example, when the storage node 100 is selected as the destination of the tentative assignment, a total "95%" of respective loads of the slices 111, 112, 113 and 114, which are set in the tentative assignment management table 523, can be evaluated as the load that is estimated to generate in the storage node 100. On that occasion, it is assumed that the load of the slice for which the assignment flag is "not yet set", but which is other than the slice tentatively assigned at that time, is not taken into consideration to calculate the load of the storage node. For example, when "P4" is tentatively assigned to the storage node 300, a total ("75%") of respective loads of the slices 311, 312 and 313 (i.e., the slices for which the assignment flag is "set") and the load of "P4", which has been tentatively assigned, is calculated as the load that is estimated to generate in the storage node 300.

[Step S17] The logical volume management portion 540 determines whether loads estimated to generate after the tentative assignment have already been calculated for all the storage nodes which are candidates for the arrangement destination. If the estimated loads have already been calculated, the processing is shifted to step S18. If the estimated loads have been not yet calculated, the processing is shifted to step S14.

[Step S18] The logical volume management portion 540 assigns the role of the primary slice, which has been selected in step S13, to the storage node for which the estimated load is minimum. The logical volume management portion 540 transmits, to the storage nodes 100, 200 and 300, an instruction to execute such slice assignment. In the case illustrated in FIG. 13, for example, the loads of the storage nodes 100 and 300 are evaluated which are estimated to generate when "P4" in the slice 114 is tentatively assigned to the storage nodes 100 and 300. More specifically, the estimated load is "95%" when "P4" is assigned to the storage node 100 and "75%" when "P4" is assign to the storage node 300. Therefore, the storage node 300 is selected as the arrangement destination of "P4".

[Step S19] The logical volume management portion 540 changes the state of the assignment flag in the tentative assignment management table 523 from "not yet set" to "set" for the slice which has been assigned in above step S18. The processing is then shifted to step S11.

In such a manner, the logical volume management portion 540 changes the arrangement of the slice, for which the assignment flag is "not yet set", by referring to the tentative assignment management table 523.

On that occasion, the logical volume management portion 540 executes the tentative assignment of the relevant slices to a plurality of storage nodes, which are candidates for the assignment destination, in order starting from the slice which has a comparatively larger load. Then, the logical volume management portion 540 evaluates a load that is estimated to generate in each of the candidate storage nodes when the relevant slice is actually assigned to the same. Further, the logical volume management portion 540 assigns the relevant slice to the storage node for which the estimated load is minimum. At that time, the logical volume management portion 540 selects the assignment destination such that the slices having the same contents (e.g., "P4" and "S4") will not belong to the storage node which is the candidate for the assignment destination.

When the storage devices 110, 210, 310 and 410 differ in performance from one another, above step S16 may be modified so as to adjust the load of the slice, which is a target of the tentative assignment, depending on, e.g., a performance ratio between the storage devices. For example, the storage device 110 may have higher performance than the storage device 410 in a disk rotational speed, a mean seek time, etc. As one practical case, it is here assumed that a mean access time differs between the storage device 110 and the storage device 410 due to the above-mentioned difference in the performance, i.e., that the mean access time of the storage device 110 is a half the mean access time of the storage device 410. In such a case, "17.5%", i.e., ½ of the load of "35%" which has been measured for the slice 411, can be evaluated as a load that is newly imposed on the storage node 100.

Figure 15:
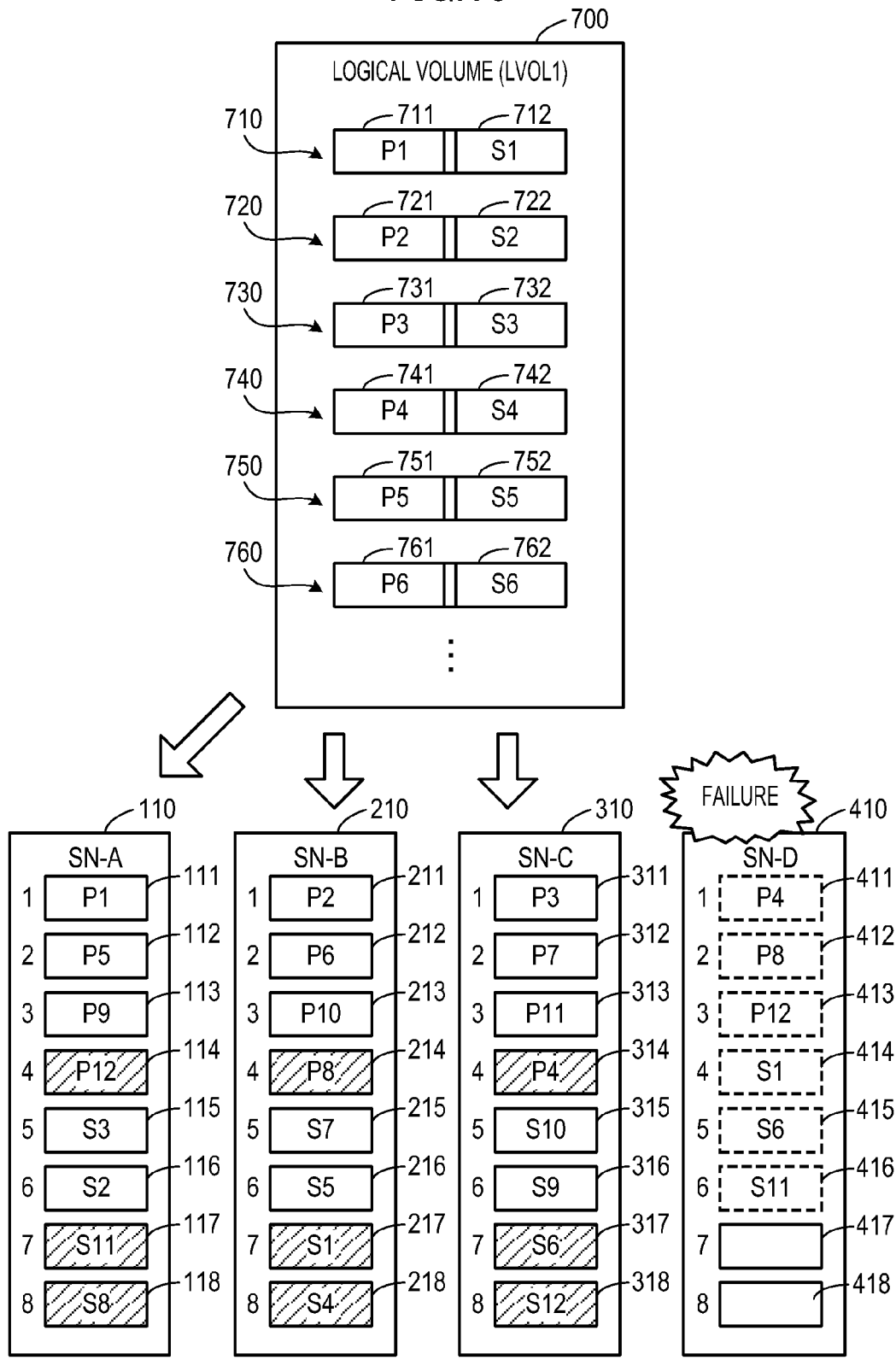
FIG. 15 illustrates an example of a data structure of the logical volume after the slice rearrangement according to the first embodiment.

FIG. 15 illustrates an example of a data structure of the logical volume after the slice rearrangement according to the first embodiment. FIG. 15 illustrates a result of rearranging the slices arranged as illustrated in FIG. 13. The logical volume management portion 540 obtains the slice arrangement illustrated in FIG. 15, starting from the slice arrangement illustrated in FIG. 13, through the procedures illustrated in FIG. 14.

More specifically, the logical volume management portion 540 executes the following procedures. It is here assumed that the storage devices 110, 210, 310 and 410 have the same performance.

(1) The logical volume management portion 540 first tentatively assigns the primary slice "P4" having the maximum load by referring to the tentative assignment management table 523 stored in the load information storage portion 520. The logical volume management portion 540 obtains ("20%"+"30%"+"10%"+"35%"="95%") as the load that is estimated to generate in the storage node 100 as a result of tentatively assigning "P4" to the storage node 100. Also, the logical volume management portion 540 obtains ("10%"+"20%"+"10%"+"35%"="75%") as the load that is estimated to generate in the storage node 300 as a result of tentatively assigning "P4" to the storage node 300. Be it noted that the storage node 200 is excluded from the assignment destination because "S4" is arranged in the storage node 200. From the above results, the logical volume management portion 540 selects the storage node 300 as the arrangement destination of "P4". Then, the logical volume management portion 540 instructs the storage nodes 200 and 300 to execute slice copy from the slice 218 to the slice 314. In addition, the logical volume management portion 540 instructs the storage nodes 200 and 300 to set the slice, which has been copied in the slice 314, to be "P4".

(2) The logical volume management portion 540 tentatively assigns the primary slice "P8" having the second maximum load. The logical volume management portion 540 obtains ("30%"+"10%"+"10%"+"25%"="75%") as the load that is estimated to generate in the storage node 200 as a result of tentatively assigning "P8" to the storage node 200. Also, the logical volume management portion 540 obtains ("10%"+"20%"+"10%"+"35%"+"25%"="100%") as the load that is estimated to generate in the storage node 300 as a result of tentatively assigning "P8" to the storage node 300. Be it noted that the storage node 100 is excluded from the assignment destination because "S8" is arranged in the storage node 100. From the above results, the logical volume management portion 540 selects the storage node 200 as the arrangement destination of "P8". Then, the logical volume management portion 540 instructs the storage nodes 100 and 200 to execute slice copy from the slice 118 to the slice 214. In addition, the logical volume management portion 540 instructs the storage nodes 100 and 200 to set the slice, which has been copied in the slice 214, to be "P8".

(3) The logical volume management portion 540 tentatively assigns the primary slice "P12" having the minimum load. The logical volume management portion 540 obtains ("20%"+"30%"+"10%"+"20%"="80%") as the load that is estimated to generate in the storage node 100 as a result of tentatively assigning "P12" to the storage node 100. Also, the logical volume management portion 540 obtains ("30%"+"10%"+"10%"+"25%"+"20%"="95%") as the load that is estimated to generate in the storage node 200 as a result of tentatively assigning "P12" to the storage node 200. Be it noted that the storage node 300 is excluded from the assignment destination because "S12" is arranged in the storage node 300. From the above results, the logical volume management portion 540 selects the storage node 100 as the arrangement destination of "P12". Then, the logical volume management portion 540 instructs the storage nodes 100 and 300 to execute slice copy from the slice 318 to the slice 114. In addition, the logical volume management portion 540 instructs the storage nodes 100 and 300 to set the slice, which has been copied in the slice 114, to be "P12".

By executing the slice rearrangement in such a manner, the primary slice and the secondary slice both having the same contents can be prevented from belonging to the same storage node. It is hence possible to hold reliability of the relevant data and to level the loads of the storage nodes.

Figure 16:
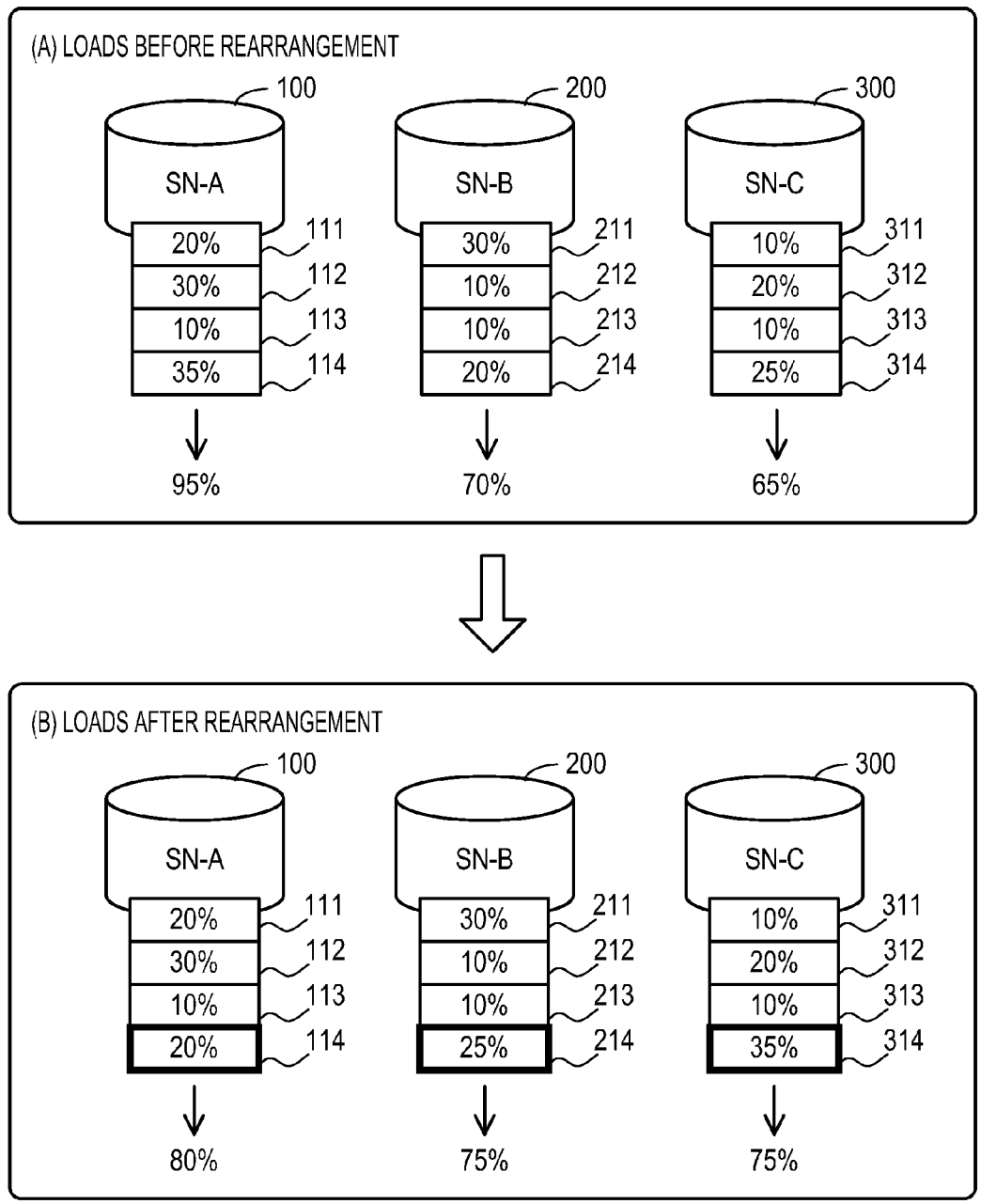
FIG. 16 illustrates a concrete example of loads after the slice rearrangement according to the first embodiment.

FIG. 16 illustrates a concrete example of loads after the slice rearrangement according to the first embodiment. (A) in FIG. 16 illustrates a situation of respective loads of the storage nodes (corresponding to the state of FIG. 13) before the slice rearrangement. (B) in FIG. 16 illustrates a situation of respective loads of the storage nodes (corresponding to the state of FIG. 15) after the slice rearrangement.

When the storage node 400 has failed, the logical volume management portion 540 transfers the role of the storage node 400 to the storage nodes 100, 200 and 300. In other words, the secondary slices on the storage nodes 100, 200 and 300, which correspond to the primary slices having so far been assigned to the storage node 400, are changed to the primary slices. More specifically, "S4" in the slice 114 is changed to "P4", "S12" in the slice 214 is changed to "P12", and "S8" in the slice 314 is "P8".

With the slice exchange described above, the access load of the storage node 100 becomes "95%". Also, the access load of the storage node 200 becomes "70%". Further, the access load of the storage node 300 becomes "65%". This means that the load applied to the storage node 100 is too large. In view of such a situation, the logical volume management portion 540 tries to level the access loads of the storage nodes 100, 200 and 300 by rearranging the roles of the newly transferred primary slices.

As a result of the rearrangement, "P12" is assigned to the slice 114, "P8" is assigned to the slice 214, and "P4" is assigned to the slice 314. Accordingly, the access load of the storage node 100 becomes "80%". Also, the access load of the storage node 200 becomes "75%". Further, the access load of the storage node 300 becomes "75%".

By executing the above-described rearrangement in units of slice, the logical volume management portion 540 can level the loads of the storage nodes 100, 200 and 300 for the logical volume "LVOL1".

While the above description is made in connection with the example in which the slice arrangement is executed by detecting that the storage node 400 is disconnected from the distributed storage system due to, e.g., a failure thereof, the application is not limited to that case. For example, when the storage node 400 is to be disconnected from the distributed storage system for the purpose of maintenance, the above-described slice rearrangement can also be executed as pre-processing for the disconnection. In such a case, the logical volume management portion 540 executes the slice rearrangement, for example, at the timing of receiving, from the management node 30, an instruction to execute the slice rearrangement.

A second embodiment will be described in detail below with reference to the drawings. The following description is made primarily about the differences between the first embodiment and the second embodiment, and similar matters to those in the first embodiment are not described here.

The first embodiment has been described in connection with the example in which any of the storage nodes 100, 200, 300 and 400 is disconnected from the distributed storage system due to, e.g., a failure thereof. The second embodiment is described in connection with an example in which loads are leveled among the storage nodes 100, 200, 300 and 400 which are normally operating.

The configuration of a distributed storage system, hardware of various nodes, a logical volume, and functional configurations in the second embodiment are the same as those in the first embodiment illustrated in FIGS. 2 to 5, and hence descriptions of those points are omitted.

In the second embodiment, the logical volume management portion 540 is supposed to level the loads of the storage nodes 100, 200, 300 and 400 periodically (e.g., at intervals of one month) or when a predetermined operation input is entered by the administrator through the management node 30.

Further, a slice management table, a logical volume management table, an access performance table, an access statistical table, and a slice load management table have the same data structures as those of the corresponding tables, illustrated in FIGS. 6 to 10, in the first embodiment, and hence descriptions of those tables are also omitted.

The following description is made, by way of example, in connection with the case in which the logical volume management portion 540 tries to level the loads for the logical volume 700 illustrated in FIG. 4.

FIG. 17 illustrates an example of a data structure of a storage-node load management table according to a second embodiment. A storage-node load management table 522a is generated by the logical volume management portion 540 and is stored in the load information storage portion 520. The storage-node load management table 522a corresponds to the storage-node load management table 522 described above with reference to FIG. 11 in the first embodiment. Because the storage-node load management table 522a has the same structure as the storage-node load management table 522, a description of the structure of the former is omitted.

The storage-node load management table 522a sets therein information indicating, for example, that the node ID is "SN-A", the load provided by slices which have already been tentatively assigned is "0%", and the load provided by slices for which the assignment destination is under consideration is "90%". In this state, all primary slices (i.e., the slices 111, 112 and 113) managed by the storage node 100 are considered as targets of the rearrangement.

Starting from the above-mentioned state, the logical volume management portion 540 successively executes the tentative assignment of all primary slices, which are arranged in the storage nodes 100, 200, 300 and 400, and evaluates the loads that are estimated to generate in the storage nodes 100, 200, 300 and 400.

Figure 18:
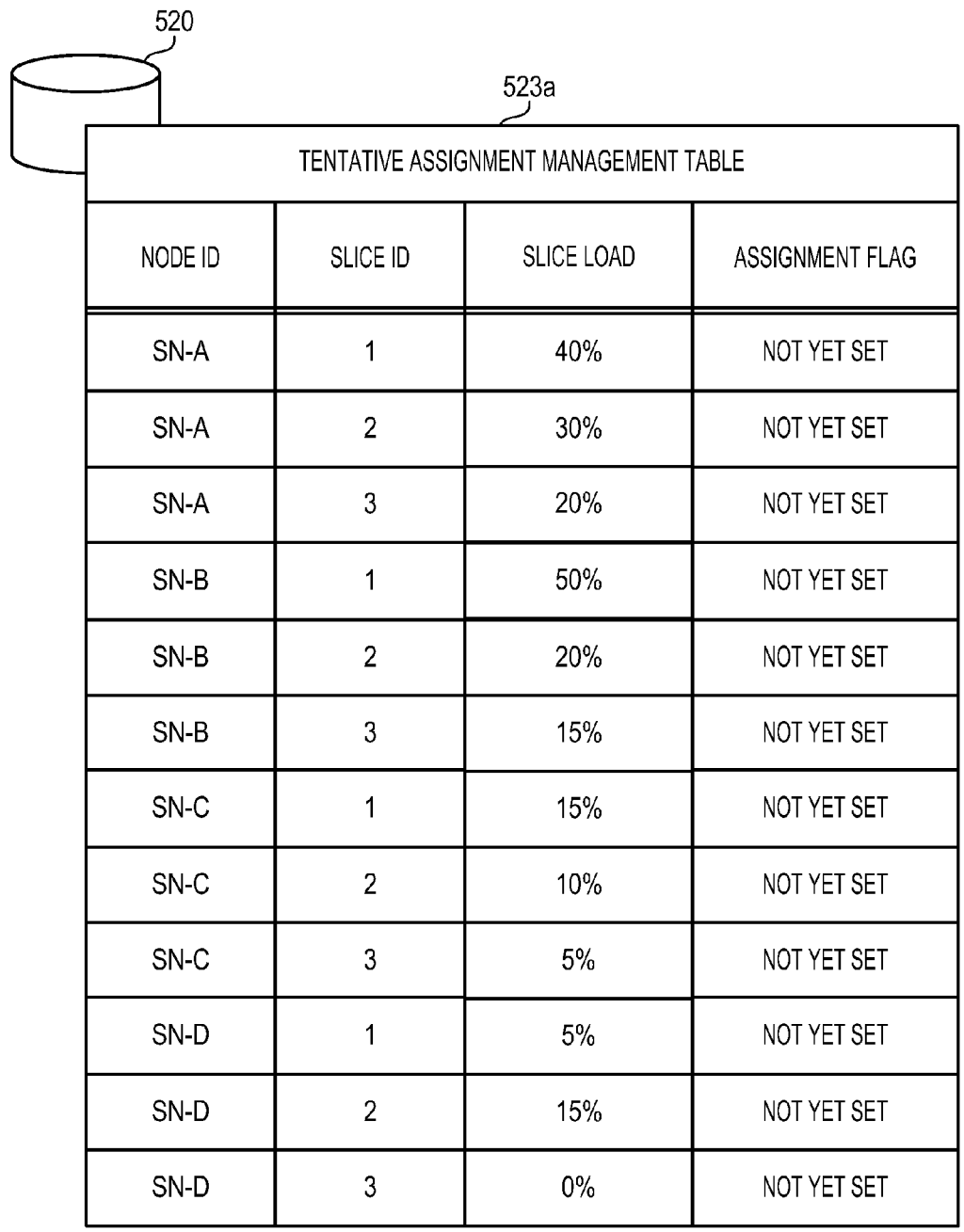
FIG. 18 illustrates an example of a data structure of a tentative assignment management table according to the second embodiment.

FIG. 18 illustrates an example of a data structure of a tentative assignment management table according to the second embodiment. A tentative assignment management table 523a is generated by the logical volume management portion 540 and is stored in the load information storage portion 520. The tentative assignment management table 523a corresponds to the tentative assignment management table 523 described above with reference to FIG. 12 in the first embodiment. Because the tentative assignment management table 523a has the same structure as the tentative assignment management table 523, a description of the structure of the former is omitted.

The tentative assignment management table 523a sets therein information indicating, for example, that the node ID is "SN-A", the slice ID is "1", the slice load is "40%", and the assignment flag is "not yet set". In the tentative assignment management table 523a, the assignment flag is in the state of "not yet set" for all the slices at the timing of the start of a rearrangement process. Stated another way, all the primary slices arranged in the storage nodes 100, 200, 300 and 400 are targets of the rearrangement to be executed by the logical volume management portion 540.

In the above-described configuration, the logical volume management portion 540 tries to level the access loads of the storage nodes 100, 200, 300 and 400 in accordance with the procedures described above with reference to FIG. 14 in the first embodiment. As a result of the leveling, the following slice arrangement is obtained from the slice arrangement illustrated in FIG. 4.

Figure 19:
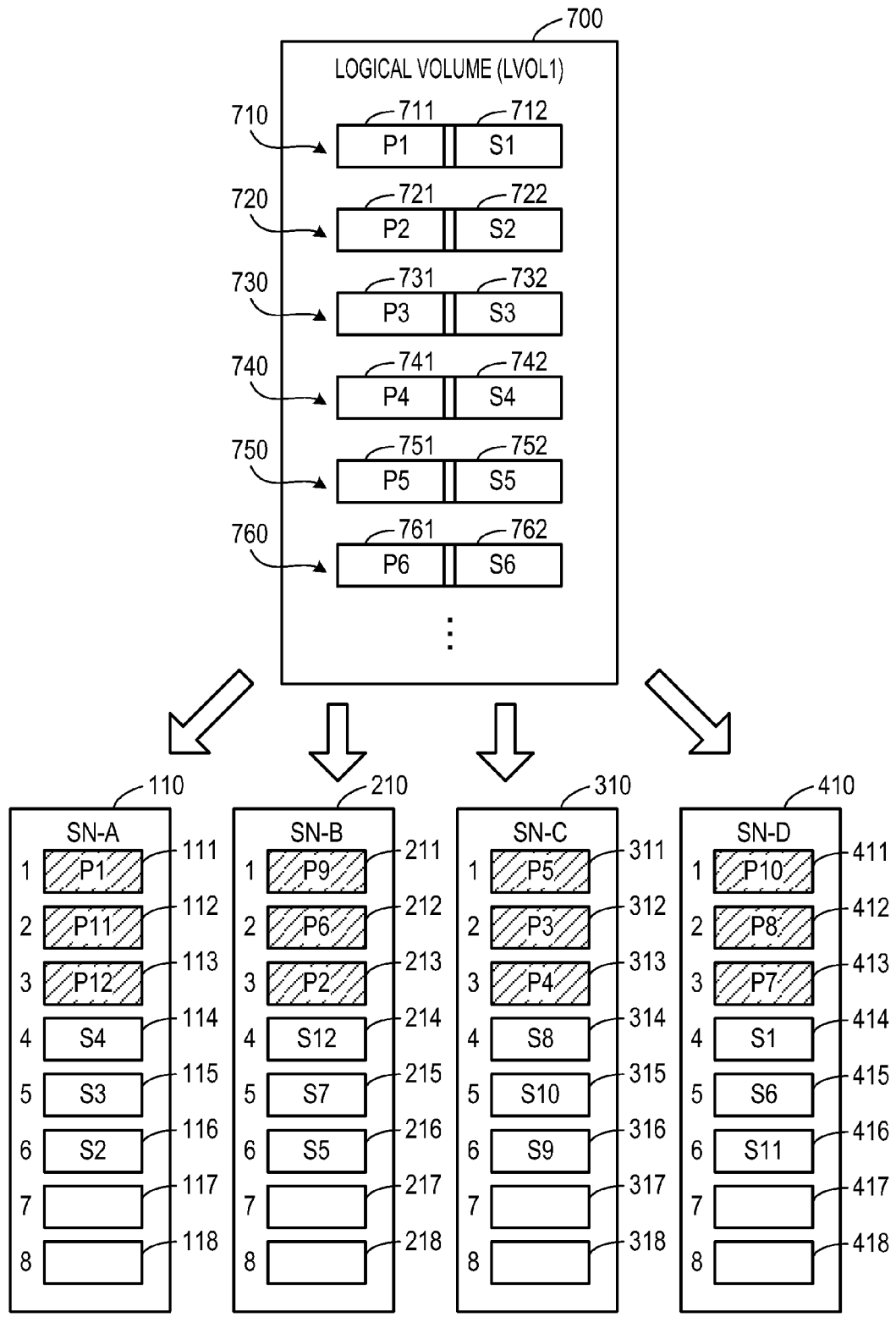
FIG. 19 illustrates an example of a data structure of the logical volume after the slice rearrangement according to the second embodiment.

FIG. 19 illustrates an example of a data structure of the logical volume after the slice rearrangement according to the second embodiment. FIG. 15 illustrates the result of rearranging the slices arranged as illustrated in FIG. 4. The logical volume management portion 540 obtains the slice arrangement illustrated in FIG. 19, starting from the slice arrangement illustrated in FIG. 4, through the procedures illustrated in FIG. 14.

More specifically, the logical volume management portion 540 executes the following procedures. It is here assumed that the storage devices 110, 210, 310 and 410 have the same performance. It is also assumed that when there are equal values which are to be compared with each other in determining the order in priority, a smaller node ID is preferred to a larger node ID (e.g., SN-A has higher priority than SN-B).

(1) The logical volume management portion 540 first tentatively assigns the primary slice "P1" having the maximum load by referring to the tentative assignment management table 523a stored in the load information storage portion 520. Be it noted that "S1" is arranged in the storage node 400. Therefore, the storage node 400 is excluded from the assignment destination of "P1". Because primary slices are not yet assigned to any storage nodes in this stage, the logical volume management portion 540 can arrange "P1" in any of the storage nodes 100, 200, 300 and 400. In the example of FIG. 19, the logical volume management portion 540 assigns "P1" to the storage node 100.

(2) The logical volume management portion 540 then tentatively assigns the primary slice "P5". The logical volume management portion 540 obtains ("40%"+"30%"="70%") as a load that is estimated to generate in the storage node 100 as a result of tentatively assigning "P5" to the storage node 100. Also, the logical volume management portion 540 obtains "30%" as a load that is estimated to generate in each of the storage nodes 300 and 400 as a result of tentatively assigning "P5" to the storage nodes 300 and 400. Be it noted that "S5" is arranged in the storage node 200. Therefore, the storage node 200 is excluded from the assignment destination of "P5". Because the loads estimated to generate in the storage nodes 300 and 400 are the same, "P5" can be arranged in any of the storage nodes 300 and 400. In the example of FIG. 19, the logical volume management portion 540 assigns "P5" to the storage node 300.

(3) The logical volume management portion 540 then tentatively assigns the primary slice "P9". The logical volume management portion 540 obtains ("40%"+"20%"="60%") as a load that is estimated to generate in the storage node 100 as a result of tentatively assigning "P9" to the storage node 100. Also, the logical volume management portion 540 obtains "20%" as a load that is estimated to generate in the storage node 200 as a result of tentatively assigning "P9" to the storage node 200. Similarly, "50%" and "20%" are obtained as loads that are estimated to generate in the storage nodes 300 and 400, respectively. Hence, the logical volume management portion 540 assigns "P9" to the storage node 200.

(4) The logical volume management portion 540 then tentatively assigns the primary slice "P6". Be it noted that "S6" is arranged in the storage node 400. Therefore, the storage node 400 is excluded from the assignment destination of "P6". The logical volume management portion 540 obtains "60%", "40%" and "50%" as loads that are estimated to generate in the storage nodes 100, 200 and 300, respectively. Hence, the logical volume management portion 540 assigns "P6" to the storage node 200.

(5) The logical volume management portion 540 then tentatively assigns the primary slice "P10". Be it noted that "S10" is arranged in the storage node 300. Therefore, the storage node 300 is excluded from the assignment destination of "P10". The logical volume management portion 540 obtains "55%", "55%" and "15%" as loads that are estimated to generate in the storage nodes 100, 200 and 400, respectively. Hence, the logical volume management portion 540 assigns "P10" to the storage node 400.

Thereafter, the logical volume management portion 540 successively determines the assignment destination of "P3", "P8", "P7", "P2", "P11", "P4" and "P12" in accordance with the procedures described above with reference to FIG. 14. As a result, the slice arrangement illustrated in FIG. 19 is obtained.

By executing the slice rearrangement in such a manner, the primary slice and the secondary slice both having the same contents can be prevented from belonging to the same storage node. It is hence possible to hold reliability of the relevant data and to level the loads of the storage nodes.

Figure 20:
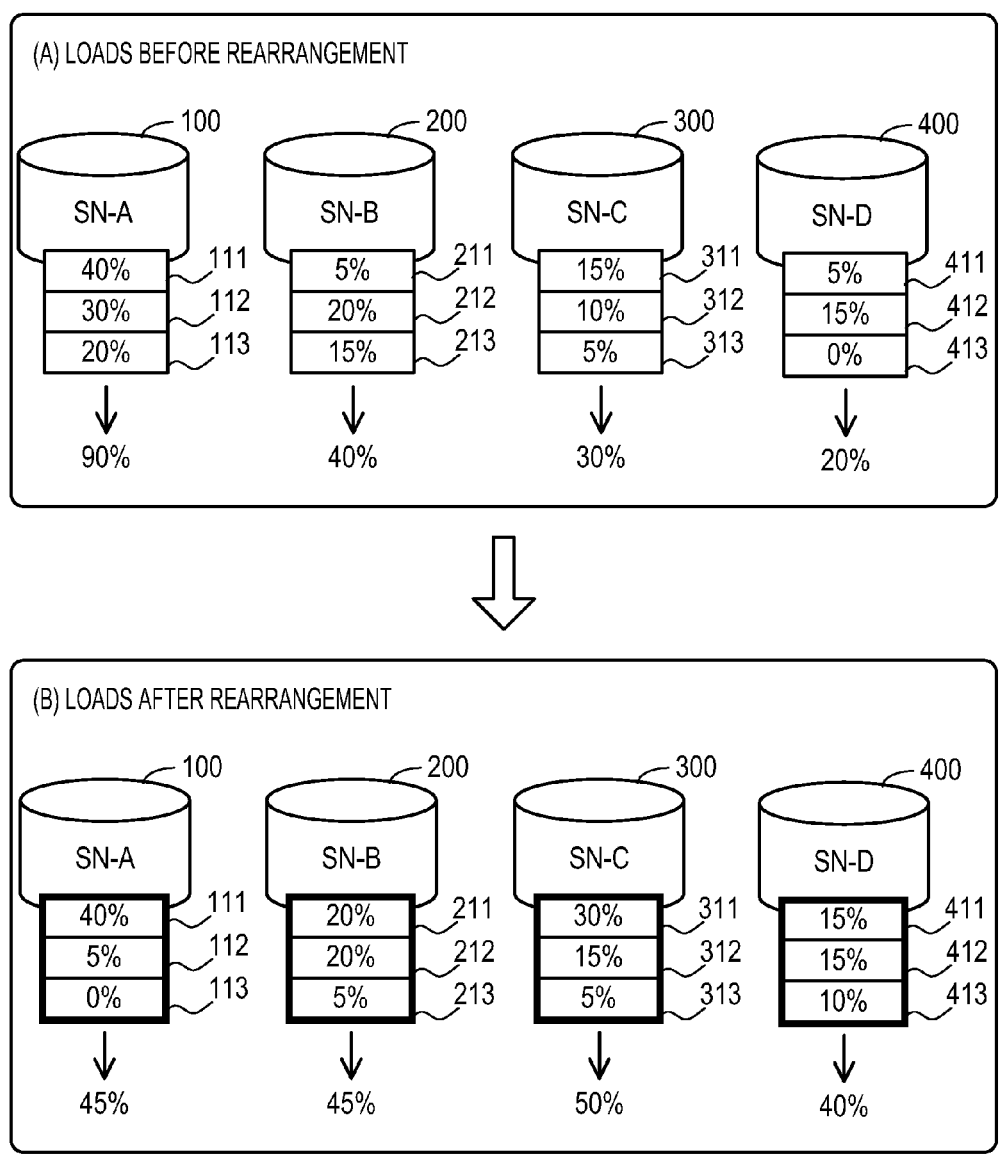
FIG. 20 illustrates a concrete example of loads after the slice rearrangement according to the second embodiment.

FIG. 20 illustrates a concrete example of loads after the slice rearrangement according to the second embodiment. (A) in FIG. 20 illustrates a situation of respective loads of the storage nodes (corresponding to the state of FIG. 13) before the slice rearrangement. (B) in FIG. 20 illustrates a situation of respective loads of the storage nodes (corresponding to the state of FIG. 19) after the slice rearrangement.

The logical volume management portion 540 periodically levels the loads of the storage nodes 100, 200, 300 and 400 based on the access information obtained from those storage nodes. In the state of (A) in FIG. 20, the loads of the storage nodes 100, 200, 300 and 400 are respectively "90%", "40%", "30%" and "20%". In other words, the load applied to the storage node 100 is too large.

In view of such a situation, the logical volume management portion 540 tries to level the access loads and obtains the slice arrangement illustrated in FIG. 19. As a result, "P1", "P11" and "P12" are arranged in the storage node 100. Also, "P9", "P6" and "P2" are arranged in the storage node 200. "P5", "P3" and "P4" are arranged in the storage node 300. "P10", "P8" and "P7" are arranged in the storage node 400. Thus, the loads of the storage nodes 100, 200, 300 and 400 become respectively "45%", "45%", "50%" and "40%". In other words, by executing the rearrangement in units of slice as described above, the logical volume management portion 540 can level the loads of the storage nodes 100, 200, 300 and 400 for the logical volume "LVOL1".

As seen from the above description, the control node 500 can change the arrangement of the slices depending on respective loads of the slices in the storage nodes 100, 200, 300 and 400 such that the loads of the storage nodes 100, 200, 300 and 400 are leveled. It is hence possible to avoid the loads from being locally increased in excess, and to improve the access performance in the entire system.

Further, when the data arrangement is changed, the primary slice and the secondary slice corresponding to the former are prevented from belonging to the same single storage node because those paired slices are arranged in different storage nodes. It is hence possible to avoid a trouble that when one storage node is disconnected from the distributed storage system, both of redundant data cannot be accessed, and to prevent reduction of reliability.

The control node 500 periodically obtains the access information of the storage nodes 100, 200, 300 and 400. In addition, the control node 500 monitors the loads of the storage nodes 100, 200, 300 and 400 at all times.

Therefore, even when any of the storage nodes is abruptly disconnected at some timing, the loads can be evaluated from the access information that has been obtained immediately before.

Also, the control node 500 executes the above-described slice rearrangement at the timing when any of the storage nodes 100, 200, 300 and 400 is stopped, or at the timing when the occurrence of a failure in any of the storage nodes is detected. Alternatively, the control node 500 executes the slice rearrangement periodically (e.g., at intervals of one month).

Further, the control node 500 may execute the slice rearrangement when any of the access loads of the storage nodes 100, 200, 300 and 400 has exceeded a predetermined threshold.

Thus, by executing the slice rearrangement as appropriate at the predetermined timing, the control node 500 can operate the distributed storage system with higher efficiency in consideration of the access performance of the distributed storage system.

Accordingly, the loads of the storage nodes belonging to the distributed storage system can be leveled.

The functions of the control node 500 can be realized by causing a computer to execute a program that describes the processing details of the functions of the control node 500. The program describing the processing details of those functions can be recorded on a computer-readable recording medium. Examples of the computer-readable recording medium include a magnetic storage device, an optical disc, a magneto-optical recording medium, and a semiconductor memory. Examples of the magnetic storage device include a hard disk drive (HDD), a flexible disk (FD), and a magnetic tape. Examples of the optical disc includes a DVD (Digital Versatile Disc), a DVD-RAM, a CD-ROM (Compact Disc Read Only memory), and a CD-R (Recordable)/RW (ReWritable). An example of the magneto-optical recording medium is an MO (Magneto-Optical) disc. The above described media are non-transitory media.

When the program is distributed to users, a portable recording medium, such as a DVD or a CD-ROM, on which the program is recorded, is made available through the market. As an alternative, the program may be stored in a memory of a server computer and transferred from the server computer to another computer.

A computer executing the program stores the program recorded on the portable recording medium or the program transferred from the server computer in its memory, for example. Then, the computer reads the program from its memory and executes processing in accordance with the program. As an alternative, the computer may read the program directly from the portable recording medium and execute processing in accordance with the program. Further, each time the program is transferred from the server computer, the computer may execute processing in accordance with the received program successively.

While the management program, the management device, and the management method according to the embodiments have been described above, practicable embodiments are not limited to the illustrated ones and the configurations of various components (modules and portions) can be replaced with any suitable configurations having similar functions. Also, any other suitable components and/or steps may be added as required. Further, any two or more configurations (features) of the above-described embodiments may be combined with each other.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A non-transitory computer-readable recording medium storing a management program for causing a computer to manage assignment relations between a plurality of virtual storage areas included in a logical volume and actual storage areas in recording devices included respectively in a plurality of storage nodes, the actual storage areas becoming storage destinations of data which are accessed by designating the virtual storage areas, the program causing the computer to execute a procedure, the procedure comprising:

obtaining, from the plurality of storage nodes, information of accesses that are made to the actual storage areas included in the storage nodes, generating load information of the actual storage areas based on the access information, and storing the generated load information in a load information storage unit;

changing, based on the load information stored in the load information storage unit, the assignment relations of the actual storage areas with respect to the virtual storage areas such that loads of the storage nodes are leveled; and instructing the plurality of storage nodes to move the data in the actual storage areas depending on change in the assignment of the actual storage areas to the virtual storage areas.

2. The non-transitory computer-readable recording medium according to claim 1, wherein the load information includes a flag indicating whether each of the actual storage areas is to be considered as a change target of an arrangement destination, and wherein the changing procedure refers to the flag included in the load information, specifies a first storage area among the actual storage areas which are to be considered as the change target of the arrangement destination, the first storage area having a maximum load, calculates loads that are estimated to generate in the storage nodes when the first storage area is assigned to each of the storage nodes, assigns data in the first storage area to the storage node for which the calculated estimated load is minimum, and changes the flag included in the load information to indicate that the first storage area is not to be considered as the change target of the arrangement destination.

3. The non-transitory computer-readable recording medium according to claim 1, wherein the changing procedure executes assignment of the data storage destinations of the data when disconnection of any of the plurality of storage nodes is detected, or when an instruction to disconnect any of the plurality of storage nodes is received.

4. The non-transitory computer-readable recording medium according to claim 1, wherein the changing procedure executes assignment of the data storage destinations at a predetermined period.

5. The non-transitory computer-readable recording medium according to claim 1, wherein the changing procedure designates, from among plural data having the same contents, main data to be used as an access destination upon receiving an access request and sub-data to be used as a backup, and changes the assignment relations such that an arrangement destination of the main data and an arrangement destination of the sub-data having the same contents as those of the main data do not belong to the same storage node, by manipulating management information stored in a management information storage unit for storing the management information that defines the storage nodes which are the respective arrangement destinations of the main data and the sub-data.

6. The non-transitory computer-readable recording medium according to claim 5,
   wherein the access information includes access performance that is measured for each of the storage nodes and that indicates a load based on the number of data inputs/outputs per unit time, which is allowable for each of the storage nodes, and access statistical information indicating the number of data accesses made to each of the storage nodes for a predetermined period, and
   wherein the obtaining procedure generates the load information based on the access performance and the access statistical information.

7. The non-transitory computer-readable recording medium according to claim 5,
   wherein the management information is prepared such that an address space of the logical volume, which is used to specify data, is divided into a plurality of logical segments and the plural data having the same contents are managed in units of the logical segment, and
   wherein the changing procedure changes the arrangement destinations of the main data and the sub-data in units of the logical segment.

8. A management device for managing assignment relations between a plurality of virtual storage areas included in a logical volume and actual storage areas in recording devices included respectively in a plurality of storage nodes, the actual storage areas becoming storage destinations of data which are accessed by designating the virtual storage areas, the device comprising:
   a load information obtaining unit obtaining, from the plurality of storage nodes, information of accesses that are made to the actual storage areas included in the storage nodes, generating load information of the actual storage areas based on the access information, and storing the generated load information in a load information storage unit;
   an assignment unit changing, based on the load information stored in the load information storage unit, the assignment relations of the actual storage areas with respect to the virtual storage areas such that loads of the storage nodes are leveled; and
   an instruction unit instructing the plurality of storage nodes to move the data in the actual storage areas depending on change in the assignment of the actual storage areas to the virtual storage areas.

9. A management method for a computer to manage assignment relations between a plurality of virtual storage areas included in a logical volume and actual storage areas in recording devices included respectively in a plurality of storage nodes, the actual storage areas becoming storage destinations of data which are accessed by designating the virtual storage areas, the program causing the computer to execute a procedure, the method comprising:
   obtaining, from the plurality of storage nodes, information of accesses that are made to the actual storage areas included in the storage nodes, generating load information of the actual storage areas based on the access information, and storing the generated load information in a load information storage unit;
   changing, based on the load information stored in the load information storage unit, the assignment relations of the actual storage areas with respect to the virtual storage areas such that loads of the storage nodes are leveled; and
   instructing the plurality of storage nodes to move the data in the actual storage areas depending on change in the assignment of the actual storage areas to the virtual storage areas.

* * * * *